US012326650B2

(12) United States Patent
Zhao et al.

(10) Patent No.: US 12,326,650 B2
(45) Date of Patent: Jun. 10, 2025

(54) ACCESSORY LENS STRUCTURES

(71) Applicant: GoPro, Inc., San Mateo, CA (US)

(72) Inventors: Peiqian Zhao, Mountain View, CA (US); Jonathan Stern, San Mateo, CA (US); Ingrid A. Cotoros, Hillsborough, CA (US)

(73) Assignee: GoPro, Inc., San Mateo, CA (US)

( * ) Notice: Subject to any disclaimer, the term of this patent is extended or adjusted under 35 U.S.C. 154(b) by 226 days.

(21) Appl. No.: 18/018,402

(22) PCT Filed: Aug. 27, 2021

(86) PCT No.: PCT/US2021/047871
§ 371 (c)(1),
(2) Date: Jan. 27, 2023

(87) PCT Pub. No.: WO2022/047109
PCT Pub. Date: Mar. 3, 2022

(65) Prior Publication Data
US 2023/0305366 A1    Sep. 28, 2023

Related U.S. Application Data

(60) Provisional application No. 63/072,526, filed on Aug. 31, 2020.

(51) Int. Cl.
G03B 17/12        (2021.01)
G02B 3/00         (2006.01)
(Continued)

(52) U.S. Cl.
CPC ............ *G03B 17/12* (2013.01); *G02B 3/005* (2013.01); *G02B 5/0273* (2013.01); *G02B 7/021* (2013.01); *G02B 13/08* (2013.01); *H04N 23/12* (2023.01)

(58) Field of Classification Search
None
See application file for complete search history.

(56) References Cited

U.S. PATENT DOCUMENTS 4,854,679 A * 8/1989 Tsuji ...................... G02B 15/06
                                                         359/673
5,455,711 A * 10/1995 Palmer .................... G02B 7/14
                                                         359/822
(Continued)

FOREIGN PATENT DOCUMENTS

CN     108345089 A      7/2018
JP     2000292696 A    10/2000
RU        2006050 C1     1/1994

OTHER PUBLICATIONS

International Preliminary Report on Patentability issued in App. No. PCT/US2021/047871, mailing date Mar. 9, 2023, 7 pages.
(Continued)

*Primary Examiner* — Rodney E Fuller
(74) *Attorney, Agent, or Firm* — Young Basile Hanlon & MacFarlane, P.C.

(57) ABSTRACT

Accessory lens structures for cameras are described. For example, an image capture device may include a mother lens assembly including a first stack of lenses; an image sensor positioned at a first end of the mother lens assembly and configured to detect images based on light incident on the image sensor through the first stack of lenses; a conversion lens assembly including a second stack of lenses, wherein the second stack of lenses is afocal; and a conversion lens mounting apparatus configured to removably attach the conversion lens assembly to the image capture device in a position over a second end of the mother lens assembly, opposite from the image sensor, such that light incident on
(Continued)

an outer lens of the second stack of lenses will be refracted through the second stack of lenses and the first stack of lenses to the image sensor.

20 Claims, 12 Drawing Sheets

(51) Int. Cl.
    *G02B 5/02*         (2006.01)
    *G02B 7/02*         (2021.01)
    *G02B 13/08*       (2006.01)
    *H04N 23/12*      (2023.01)

(56) References Cited

U.S. PATENT DOCUMENTS

| | | | |
|---|---|---|---|
| 5,502,592 A * | 3/1996 | Jamieson | G02B 13/06 359/356 |
| 8,064,149 B2 * | 11/2011 | Kweon | G02B 9/64 359/755 |
| 2001/0043406 A1 * | 11/2001 | Mori | G02B 15/10 359/695 |
| 2010/0277816 A1 * | 11/2010 | Kweon | G02B 13/06 359/755 |
| 2018/0210173 A1 | 7/2018 | Blahnik | |

OTHER PUBLICATIONS

International Search Report and Written Opinion for App. No. PCT/US2021/047871, dated Dec. 2, 2021, 9 pages.

* cited by examiner

ACCESSORY LENS STRUCTURES

CROSS-REFERENCE TO RELATED APPLICATIONS

This application is a 371 of International Application No. PCT/US2021/047871 filed on Aug. 27, 2021, which claims priority to U.S. Provisional Patent Application No. 63/072,526, filed on Aug. 31, 2020, the entire disclosures of which are hereby incorporated by reference.

TECHNICAL FIELD

This disclosure relates to accessory lens structures.

BACKGROUND

Image capture devices, such as cameras, may capture content as images (e.g., still images or frames of video). Light may be received and focused via a lens and may be converted to an electronic image signal by an image sensor. The image signal may be processed by an image signal processor (ISP) to form an image, which may be stored and/or encoded. In some implementations, multiple images or video frames may include spatially adjacent or overlapping content. It is sometimes helpful to use an accessory lens to alter a field of view or a magnification factor of a lens stack (e.g., stack of lenses) of an image capture device. For example, a zoom lens or a telephoto lens may be attached to some cameras to alter a magnification level or field of view of the camera.

SUMMARY

Disclosed herein are implementations of accessory lens structures.

In a first aspect, the subject matter described in this specification can be embodied in image capture devices that include a mother lens assembly including a first stack of lenses; an image sensor positioned at a first end of the mother lens assembly and configured to detect images based on light incident on the image sensor through the first stack of lenses; a conversion lens assembly including a second stack of lenses, wherein the second stack of lenses is afocal; and a conversion lens mounting apparatus configured to removably attach the conversion lens assembly to the image capture device in a position over a second end of the mother lens assembly, opposite from the image sensor, such that light incident on an outer lens of the second stack of lenses will be refracted through the second stack of lenses and the first stack of lenses to the image sensor.

In the first aspect, an exit pupil of the conversion lens assembly can be sized to overfill a corresponding entrance pupil of the mother lens assembly. An amount by which the exit pupil is sized to overfill the corresponding entrance pupil can exceed a mounting tolerance of the conversion lens mounting apparatus. An amount by which the exit pupil is sized to overfill the corresponding entrance pupil can exceed a manufacturing tolerance for alignment of the second stack of lenses to a portion of the conversion lens mounting apparatus. An amount by which the exit pupil is sized to overfill the corresponding entrance pupil can exceed a manufacturing tolerance for alignment of the first stack of lenses to a portion of the conversion lens mounting apparatus. The conversion lens assembly can have a wider field of view than the mother lens assembly. The outer lens of the conversion lens assembly can be a fisheye lens. The outer lens of the conversion lens assembly can be hyper-hemispherical. The conversion lens mounting apparatus can include a bayonet mechanism configured to enable attachment of the conversion lens assembly to the image capture device. A best image plane of the second stack of lenses combined with the first stack of lenses, when the conversion lens assembly is attached to the image capture device, can be the same as a best image plane of the first stack of lenses alone when the conversion lens assembly is removed from the image capture device. A relative aperture of the second stack of lenses combined with the first stack of lenses, when the conversion lens assembly is attached to the image capture device, can be the same as a relative aperture of the first stack of lenses alone when the conversion lens assembly is removed from the image capture device. The first aspect may include any combination of the features described in this paragraph.

In a second aspect, the subject matter described in this specification can be embodied in image capture devices that include a mother lens assembly including a first stack of lenses; an image sensor positioned at a first end of the mother lens assembly and configured to detect images based on light incident on the image sensor through the first stack of lenses; a conversion lens assembly including a second stack of lenses; and a conversion lens mounting apparatus configured to removably attach the conversion lens assembly to the image capture device in a position over a second end of the mother lens assembly, opposite from the image sensor, such that light incident on an outer lens of the second stack of lenses will be refracted through the second stack of lenses and the first stack of lenses to the image sensor, wherein a best image plane of the second stack of lenses combined with the first stack of lenses, when the conversion lens assembly is attached to the image capture device, is the same as a best image plane of the first stack of lenses alone, when the conversion lens assembly is removed from the image capture device.

In the second aspect, an image circle of the second stack of lenses combined with the first stack of lenses, when the conversion lens assembly is attached to the image capture device, can be inscribed within a light sensitive area of the image sensor. An image circle of the first stack of lenses alone, when the conversion lens assembly is removed from the image capture device, can encompass a light sensitive area of the image sensor. The conversion lens assembly can have a wider field of view than the mother lens assembly. A relative aperture of the second stack of lenses combined with the first stack of lenses, when the conversion lens assembly is attached to the image capture device, can be the same as a relative aperture of the first stack of lenses alone when the conversion lens assembly is removed from the image capture device. The second aspect may include any combination of the features described in this paragraph.

In a third aspect, the subject matter described in this specification can be embodied in image capture devices that include a mother lens assembly including a first stack of lenses; an image sensor positioned at a first end of the mother lens assembly and configured to detect images based on light incident on the image sensor through the first stack of lenses; a conversion lens assembly including a second stack of lenses; and a conversion lens mounting apparatus configured to removably attach the conversion lens assembly to the image capture device in a position over a second end of the mother lens assembly, opposite from the image sensor, such that light incident on an outer lens of the second stack of lenses will be refracted through the second stack of lenses and the first stack of lenses to the image sensor, wherein a relative aperture of the second stack of lenses combined with the first stack of lenses, when the conversion lens assembly is attached to the image capture device, is the same as a relative aperture of the first stack of lenses alone, when the conversion lens assembly is removed from the image capture device.

In the third aspect, an image circle of the second stack of lenses combined with the first stack of lenses, when the conversion lens assembly is attached to the image capture device, can be inscribed within a light sensitive area of the image sensor. An image circle of the first stack of lenses alone, when the conversion lens assembly is removed from the image capture device, can encompass a light sensitive area of the image sensor. The conversion lens assembly can have a wider field of view than the mother lens assembly. The third aspect may include any combination of the features described in this paragraph.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
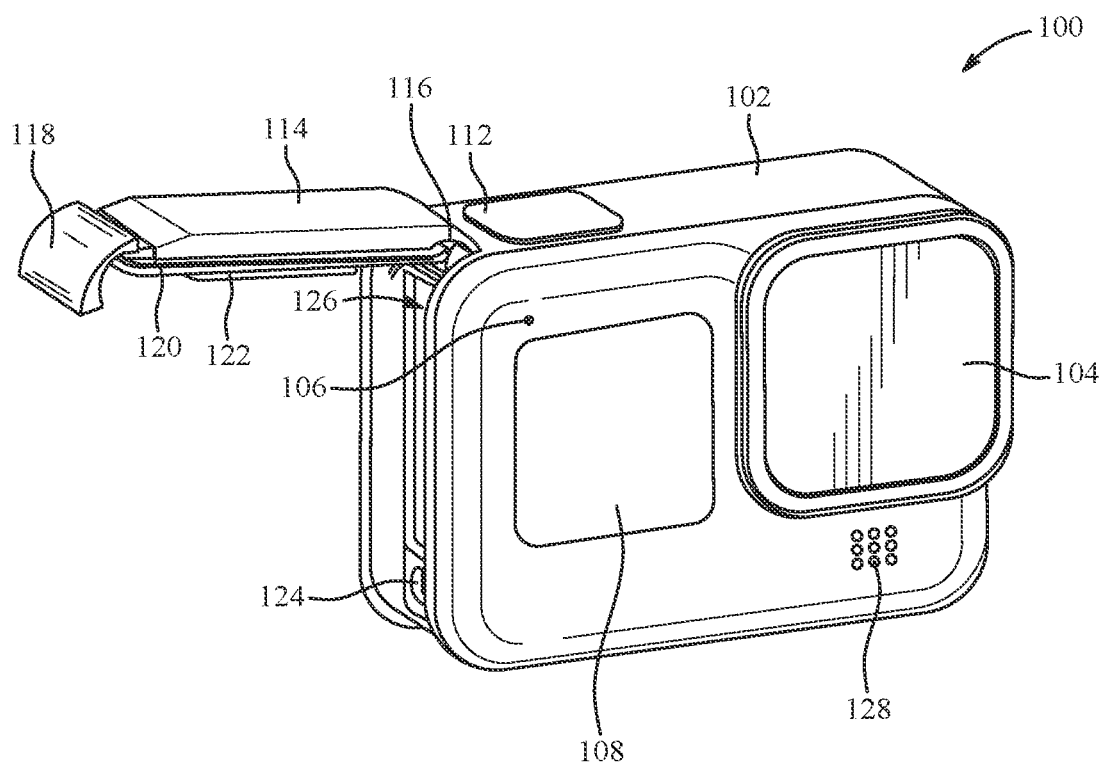
FIGS. 1A-B are isometric views of an example of an image capture device.

Accessory lens structures for image capture devices are described herein. An attachable/detachable lens system may provide two different field of views and magnifications for different usage scenarios. Some of the accessory lenses are conversion lens assemblies that are insensitive to mounting errors. For example, a conversion lens assembly may be afocal. For example, a conversion lens assembly may have an exit pupil that is sized to overfill a corresponding entrance pupil of a mother lens assembly that it combines with. Some of the accessory lenses are conversion lens assemblies that are configured to preserve a best image plane of a mother lens assembly that they combine with. Some of the accessory lenses are conversion lens assemblies that are configured to preserve a relative aperture of a mother lens assembly that they combine with.

For high image quality camera lenses or lens groups, the physical mounting tolerance or the assembly tolerance are usually very tight. For example, it may be desirable to design an accessory lens group and this accessory lens group can be attached to or detached from an existing camera lens so that an angular field of view of the camera can be altered for a specific camera operation mode. When attaching this accessory lens group to the lens group which is already embedded in a camera, the two lens groups need to be very well mechanically aligned in x,y,z translation and in tip-tilt so that good image quality can be maintained with or without the removable lens group. These tight mounting tolerances may make the camera and the accessory lens expensive and difficult to attach and detach. This disclosure describes methods of designing a camera lens groups so that the removable lens group (i.e., accessory lens) can be attached to the embedded camera lens group with loose mounting tolerances without compromising the image quality when the accessory lens is attached. Design examples are also presented.

A high image quality camera embedded with a high image quality lens group, called a mother lens, can form a specific angular field of view and magnification. It may be desirable to design an accessory lens assembly including an accessory lens group or stack in such a way that this accessory lens group can be easily (e.g., without using tools) attached to or detached from the camera. When the accessory lens group is attached to the camera, the combination of the accessory lens and the mother lens may provide a wider angular field of view and smaller magnification so that a super smooth operation mode can be realized. However, the physical alignment between the accessory lens group and the mother lens group is usually tight so that good image quality is maintained. These tight mounting tolerances may make the camera and the accessory lens expensive and/or difficult to attach and detach. This disclosure describes methods of designing the accessory lens group and its combination with the mother lens group in such ways that the mounting/alignment tolerance between the accessory lens and the mother lens is loose while the image quality is maintained when the accessory lens is attached. The mother lens may have wide angular field and may have a stop aperture inside the lens element. So, the entrance pupil size, position and orientation may change with field of view.

In some implementations, the accessory lens will be configured as an afocal lens system and its exit pupils may match the corresponding entrance pupils of the mother lens across the field in x,y,z position and tip-tilt. The size of the exit pupils of the accessory lens group may be designed to be larger than the corresponding entrance pupils of the mother lens so that, even if the accessory lens is moved in x,y,z direction, the wavefronts exiting from the accessory lens exit pupils is still large enough to overfill the entrance pupils of the mother lens. Since the wavefront from any field point and exiting from the accessory lens has high quality, after it enters the entrance pupil of the mother lens and goes through the mother lens, it may be focused onto the image plane of the mother lens. By using an afocal configuration for the accessory lens, the image quality of the combination of the accessory lens group and the mother lens group may be insensitive to the temperature variation and assembly errors of the accessory lens, further reducing the accessory lens cost.

For example, compact camera lens system designs are described in which one group of a lens assembly (e.g., an accessory lens) can be attached or detached to another group of a lens assembly (e.g., a base lens) so that angular field of view and magnifications of a camera system can be changed. When attaching the accessory lens to the base lens, the accessory lens mounting tolerance may be pretty loose, enabling lower cost material and/or manufacturing methods for a camera.

For example, this disclosure describes designs of a compact camera lens system. This lens system is composed of two lens assembly groups. One lens assembly group, called a mother lens (e.g., the base lens), may be permanently embedded in a camera and another lens assembly group, called an accessory lens, can be removably attached or detached to the camera by a user and can be aligned to the base lens automatically. When the accessory lens is off the camera, the camera may have a smaller angular field of view and larger magnification. When the accessory lens is attached to the camera, the camera may have a larger angular field of view and smaller magnification is generated, making it possible for super smooth operation. In some implementations, the accessory lens can be attached to the base lens with loose mounting tolerance without compromising the image quality, so that lower cost and accessory lens and easy mounting become possible.

Figure 1B:
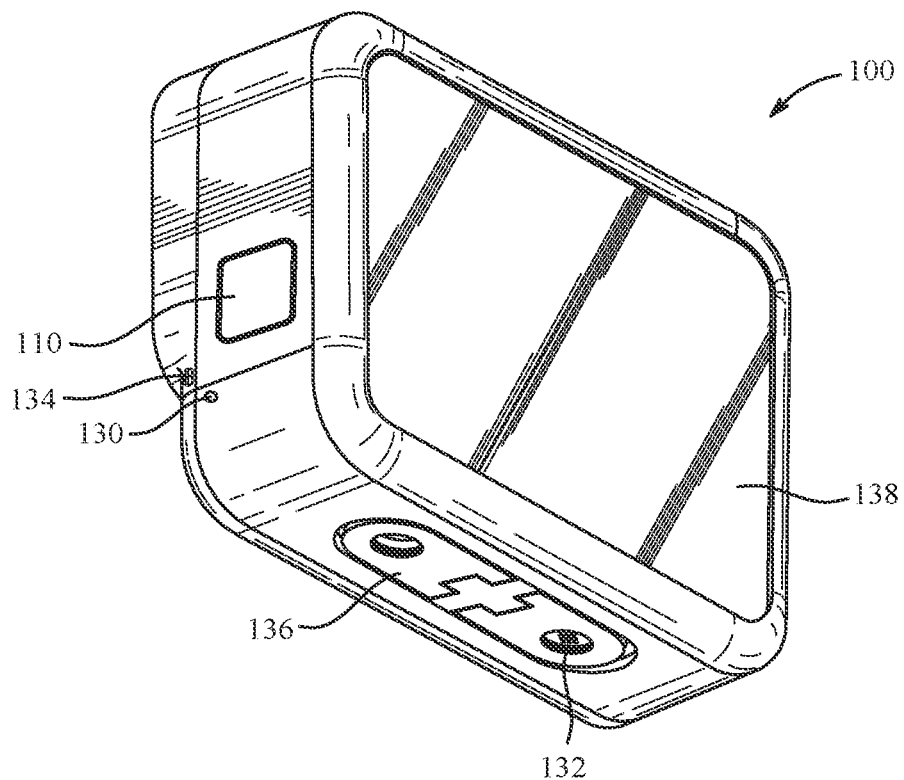

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

The image capture device 100 may include one or more lens assemblies, such as the mother lens assembly 410 and the conversion lens assembly 460 of FIG. 4. For example, the lens 104 may be an outer lens of the mother lens assembly 410 and the conversion lens assembly 460 may be removably attached to the image capture device in a position over the lens 104 using the conversion lens mounting apparatus 470.

Figure 2A:
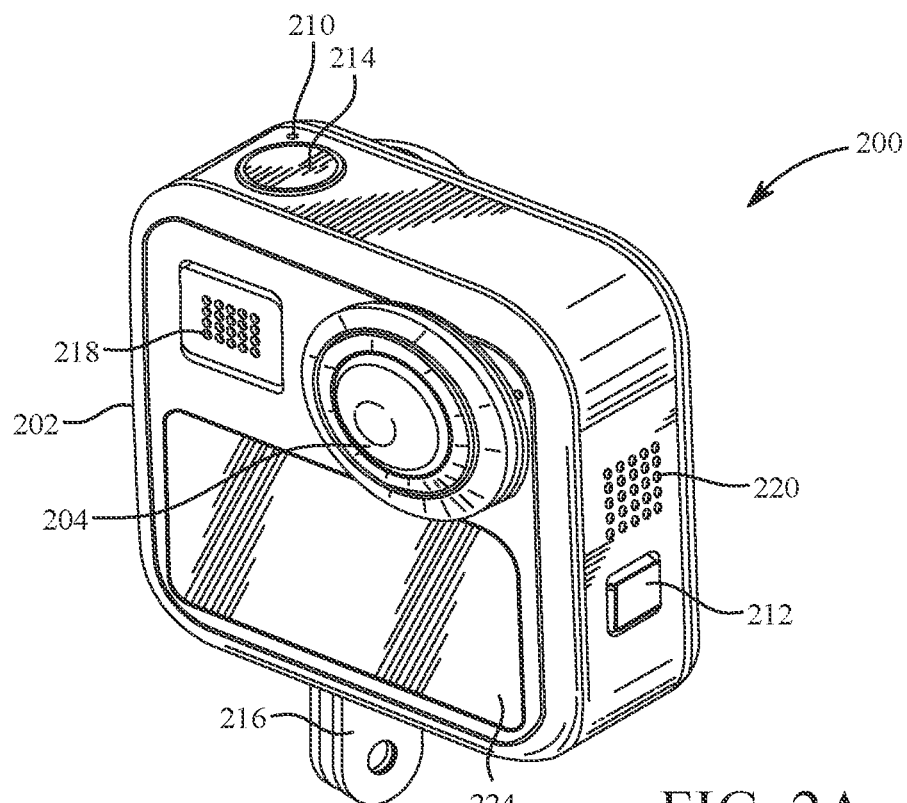
FIGS. 2A-B are isometric views of another example of an image capture device.
Figure 2B:
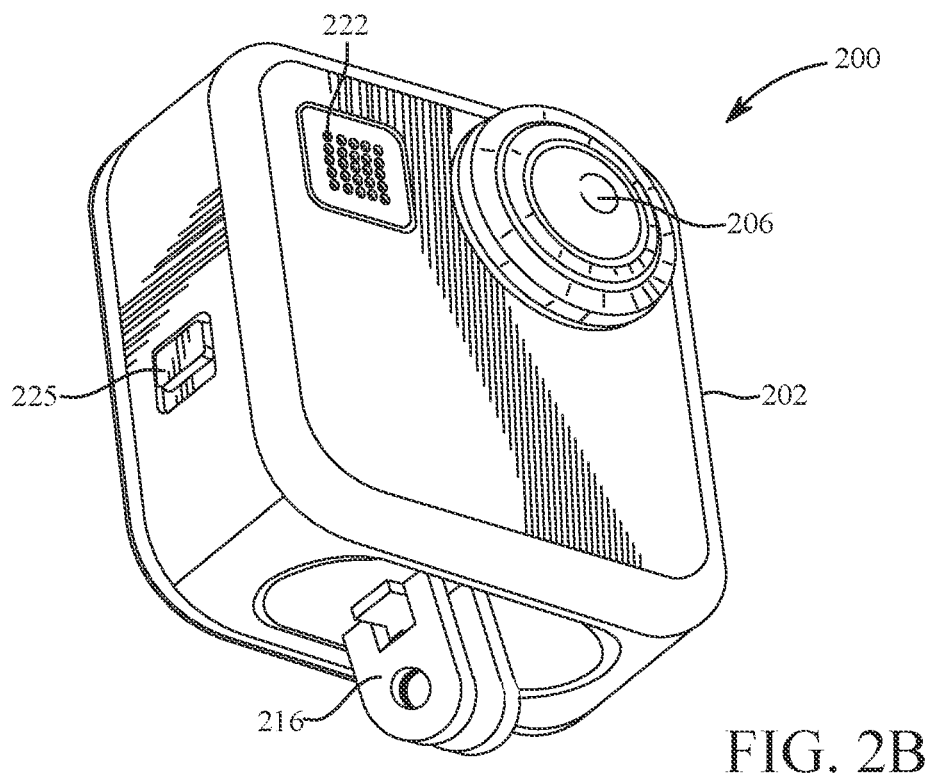

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 2C:
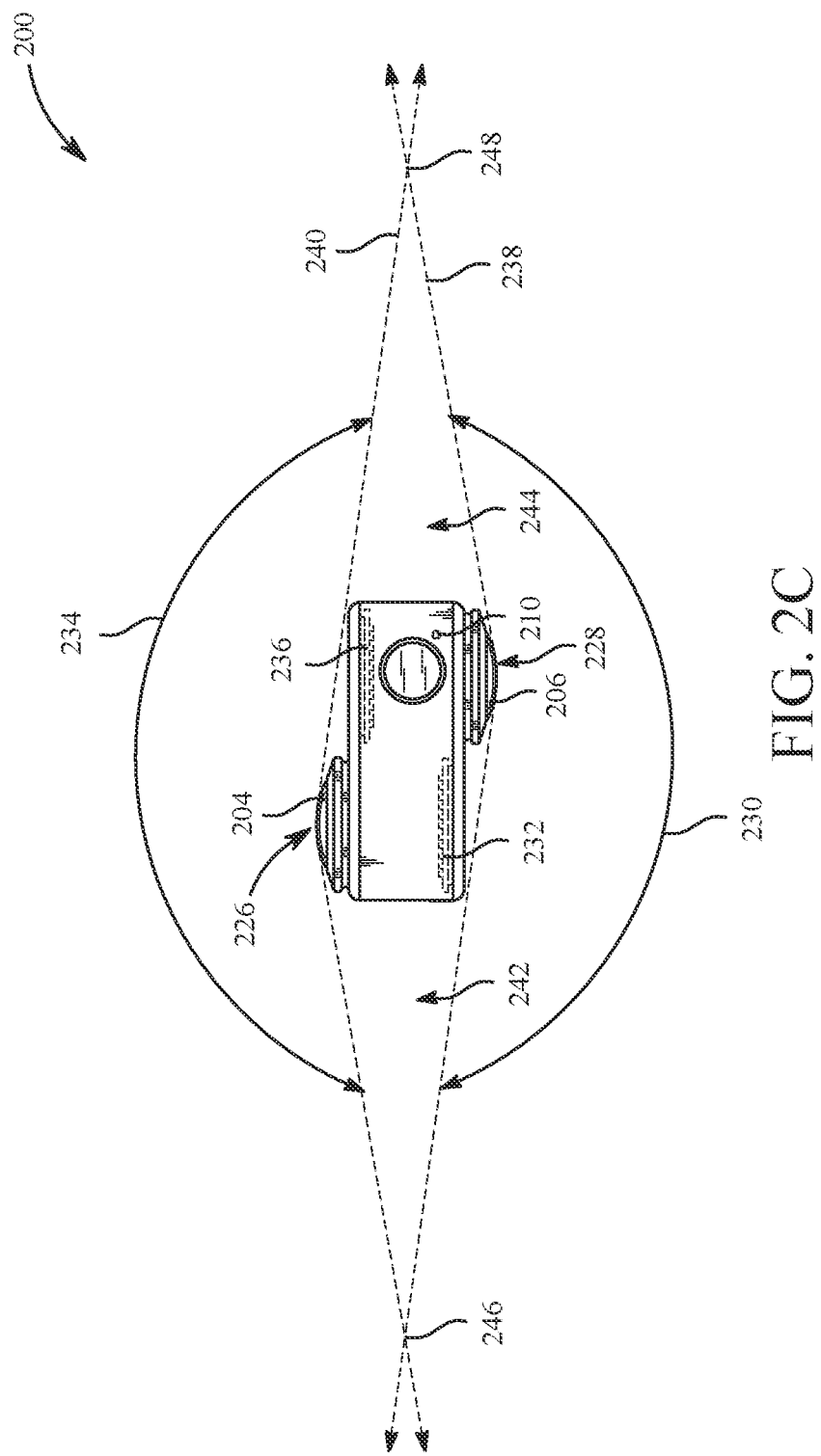
FIG. 2C is a top view of the image capture device of FIGS. 2A-B.
Figure 2D:
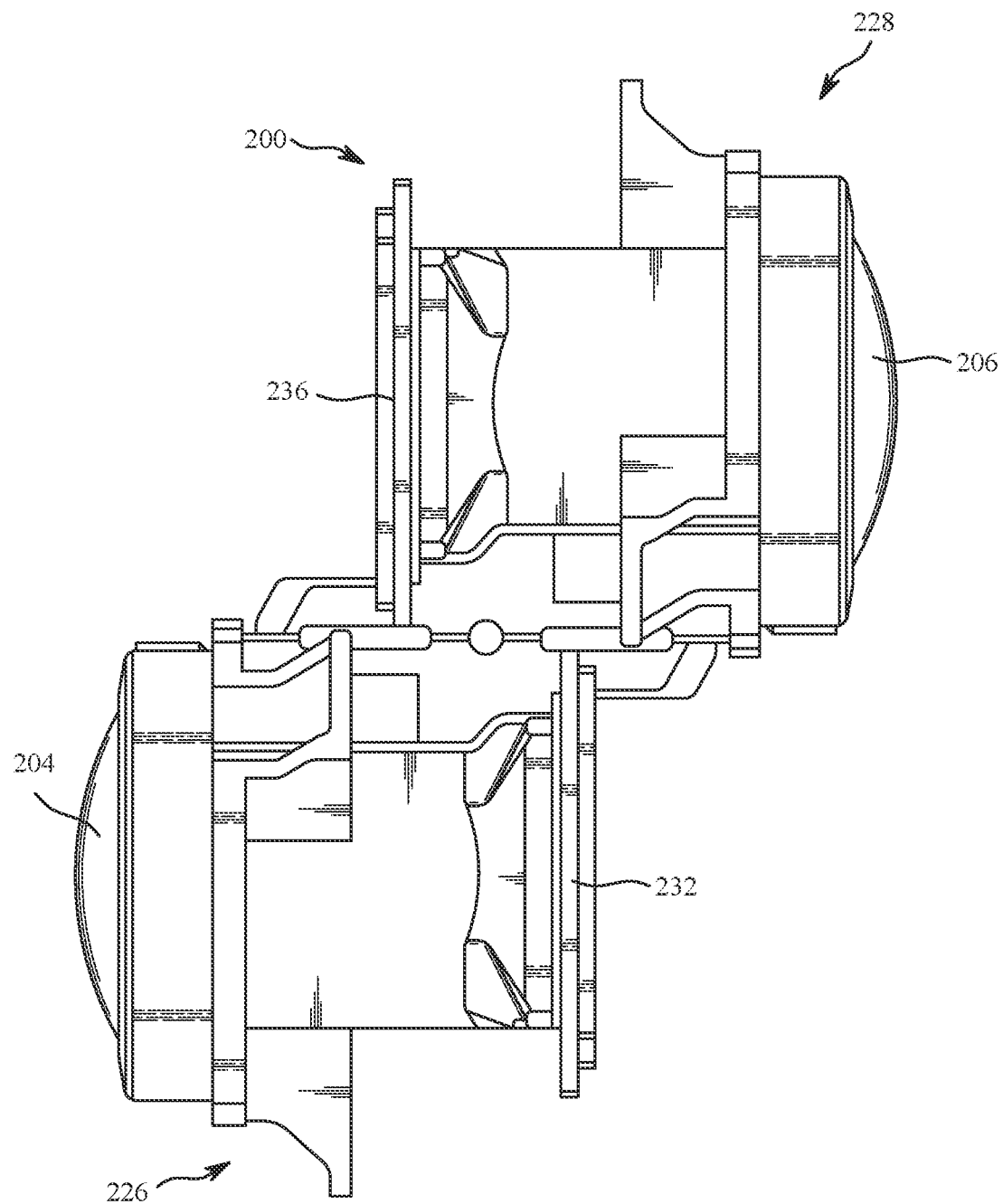
FIG. 2D is a partial cross-sectional view of the image capture device of FIG. 2C.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device 226 and a second image capture device 228. The first image capture device 226 defines a first field-of-view 230 and includes the lens 204 that receives and directs light onto a first image sensor 232. Similarly, the second image capture device 228 defines a second field-of-view 234 and includes the lens 206 that receives and directs light onto a second image sensor 236. To facilitate the capture of spherical images, the image capture devices 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone." In the dead zone, light may be obscured from the lenses 204, 206 and the corresponding image sensors 232, 236, and content in the blind spots 242, 244 may be omitted from capture. In some implementations, the image capture devices 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

The image capture device 200 may include one or more lens assemblies as components of the image capture devices 226, 228, such as the mother lens assembly 410 and the conversion lens assembly 460 of FIG. 4.

Figure 3:
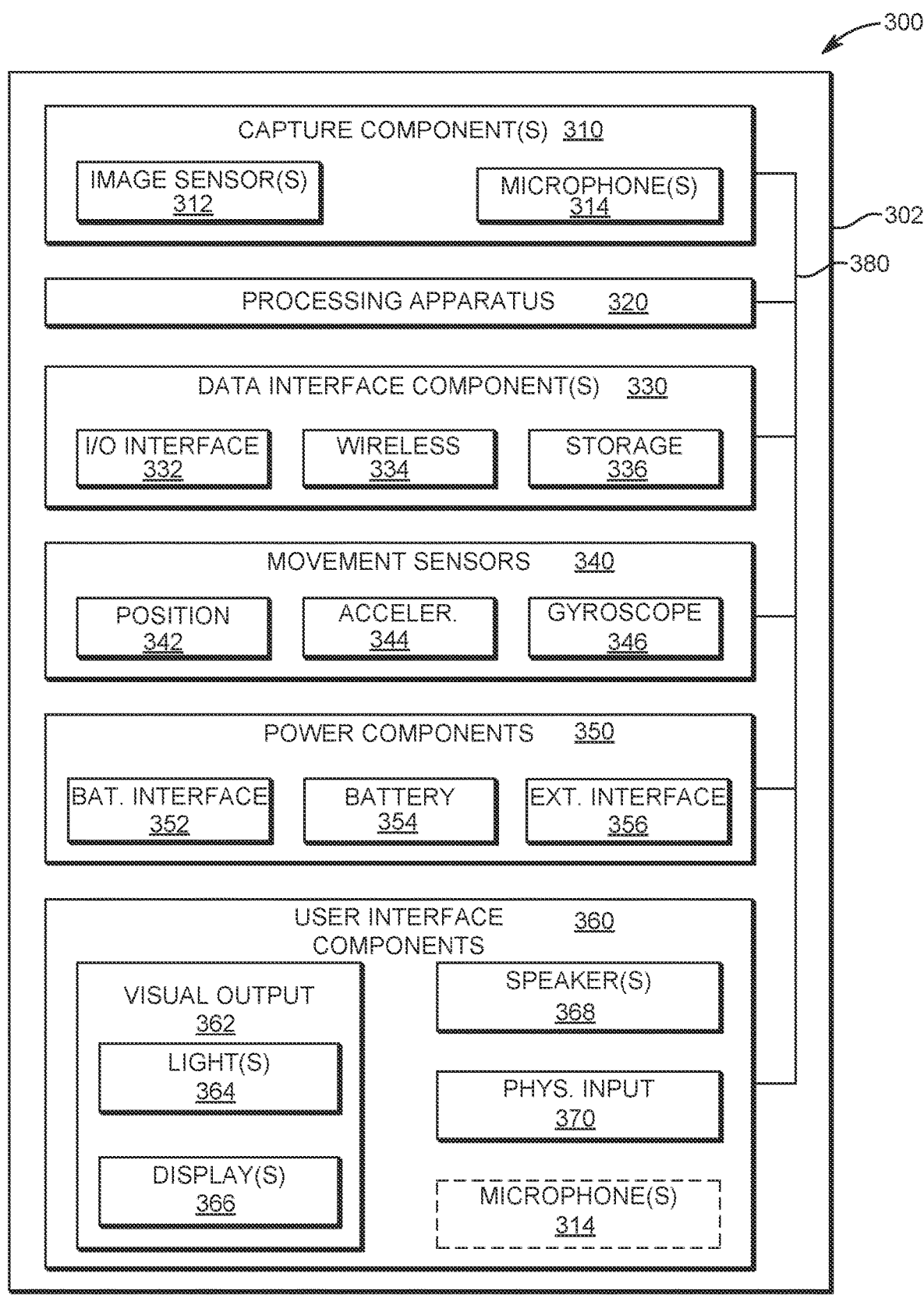
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may use one or more lens assemblies to refract light to the one or more image sensors 312 for capturing images, such as the mother lens assembly 410 and the conversion lens assembly 460 of FIG. 4.

Figure 4A:
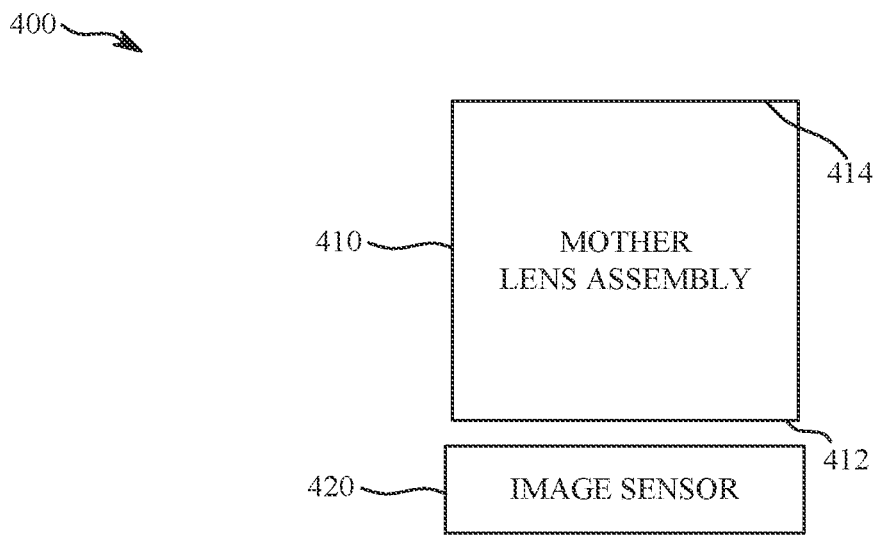
FIG. 4A is a block diagram of an example of a mother lens assembly in an image capture device.

FIG. 4A is a block diagram of an example of a system 400 including a mother lens assembly 410 in an image capture device. The mother lens assembly 410 includes a first stack of lenses (e.g., the lens stack of the mother lens assembly 700 of FIG. 7, the lens stack of the mother lens assembly 920 of FIG. 9, or the lens stack of the mother lens assembly 1020 of FIG. 10). The system 400 also includes an image sensor 420 positioned at a first end 412 of the mother lens assembly 410 and configured to detect images based on light incident on the image sensor 420 through the first stack of lenses. For example, the system 400 may be part of the image capture device 100. For example, the lens 104 may be an outer lens of the mother lens assembly 410. For example, the system 400 may be part of the image capture device 200. For example, the lens 204 or the lens 206 may be an outer lens of the mother lens assembly 410. The outer lens of the mother lens assembly 410 may be positioned at a second end 414 of the mother lens assembly 410. An image may be captured using the image sensor 420 based on light that enters the mother lens assembly 410 at the second end 414, passes through the first lens stack and exits the mother lens assembly 410 at the first end 412 to hit the image sensor 420.

Figure 4B:
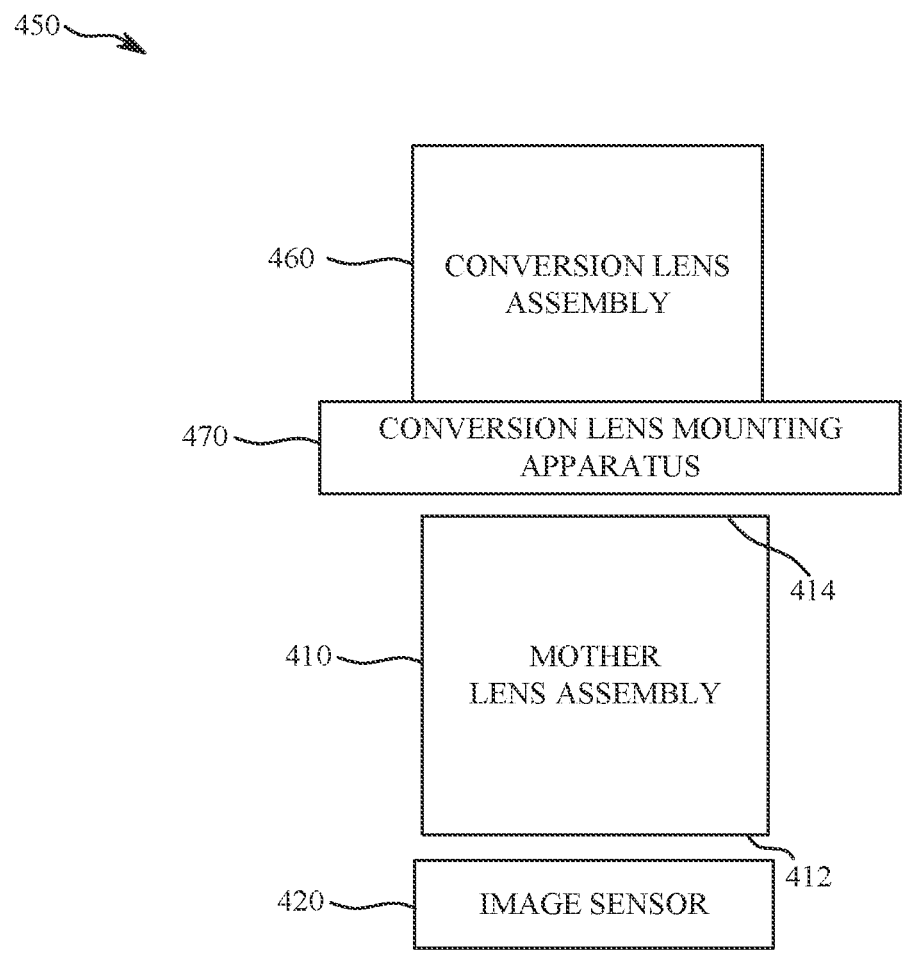
FIG. 4B is a block diagram of an example of a conversion lens assembly removably combined with a mother lens assembly to modify optical properties of an image capture device.

FIG. 4B is a block diagram of an example of a system 450 including a conversion lens assembly 460 removably combined with the mother lens assembly 410 to modify optical properties of an image capture device. The conversion lens assembly 460 includes a second stack of lenses (e.g., the lens stack of the conversion lens assembly 810 of FIG. 8, the lens stack of the conversion lens assembly 910 of FIG. 9, or the lens stack of the conversion lens assembly 1010 of FIG. 10). The system 450 includes a conversion lens mounting apparatus 470 configured to removably attach the conversion lens assembly 460 to the image capture device (e.g., the image capture device 100) in a position over the second end 414 of the mother lens assembly 410, opposite from the image sensor 420, such that light incident on an outer lens of the second stack of lenses will be refracted through the second stack of lenses and the first stack of lenses to the image sensor 420. A variety of types of conversion lens mounting apparatus 470 may be used. For example, the conversion lens mounting apparatus 470 may include a bayonet mechanism configured to enable attachment of the conversion lens assembly 460 to the image capture device. For example, the conversion lens mounting apparatus 470 may include a snap-ring mechanism configured to enable attachment of the conversion lens assembly 460 to the image capture device. For example, the conversion lens mounting apparatus 470 may include a threaded mechanism configured to enable attachment of the conversion lens assembly to the image capture device.

In some implementations, the conversion lens assembly 460 has a wider field of view than the mother lens assembly 410. For example, the conversion lens assembly 460 may be removably attached to the image capture device to expand the field of view of the image capture device (e.g., to change the filed of view from 153 degrees to 175 degrees). For example, the outer lens of the conversion lens assembly 460 may be a fisheye lens. For example, the outer lens of the conversion lens assembly 460 may be hyper-hemispherical. In some implementations, an image circle of the second lens stack combined with the first lens stack, when the conversion lens assembly 460 is attached to the image capture device, is inscribed within a light sensitive area of the image sensor 420. In some implementations, an image circle of the first lens stack alone, when the conversion lens assembly 460 is removed from the image capture device, encompasses a light sensitive area of the image sensor 420. For example, the image circle may vary with attachment of the conversion lens assembly 460 as described in relation to FIGS. 6A-B.

In some implementations, the second stack of lenses is afocal. The second stack of lenses may have an infinite focal length. The second set of lenses being afocal help to make the image quality of the system 450 that combines the first stack of lenses with the second stack of lenses insensitive to mounting or alignment errors of the conversion lens assembly relative to the mother lens assembly 410. For example, variation of a modulation transfer function (MTF) as a function of mounting errors may be low. For example, an exit pupil of the conversion lens assembly 460 may be sized to overfill a corresponding entrance pupil of the mother lens assembly 410. In some implementations, an amount by which the exit pupil is sized to overfill the corresponding entrance pupil exceeds a mounting tolerance of the conversion lens mounting apparatus 470. For example, an amount by which the exit pupil is sized to overfill the corresponding entrance pupil may exceed a manufacturing tolerance for alignment of the second lens stack to a portion of the conversion lens mounting apparatus 470. For example, an amount by which the exit pupil is sized to overfill the corresponding entrance pupil may exceed a manufacturing tolerance for alignment of the first lens stack to a portion of the conversion lens mounting apparatus 470. For example, the second stack of lenses in the conversion lens assembly 460 may be configured to reduce image quality sensitivity to mounting errors as describe in relation to FIGS. 5A-C. Using a conversion lens assembly 460 with a second lens stack that is afocal may also help to make image quality robust to temperature variations.

In some implementations, a best image plane of the second lens stack combined with the first lens stack, when the conversion lens assembly 460 is attached to the image capture device, is the same as a best image plane of the first lens stack alone, when the conversion lens assembly 460 is removed from the image capture device. The best image plane is a plane on which light passing through the first lens stack or the combined lens stacks is focused. For example, the best image plane may correspond to a surface of the image sensor 420. For example, the best image plane with the conversion lens assembly 460 may be matched to the best image plane without the conversion lens assembly 460 by constraining optical parameters of the second stack of lenses based on optical parameters of the first lens stack in the mother lens assembly.

In some implementations, a relative aperture of the second lens stack combined with the first lens stack, when the conversion lens assembly 460 is attached to the image capture device, is the same as a relative aperture of the first lens stack alone, when the conversion lens assembly 460 is removed from the image capture device. For example, the relative aperture with the conversion lens assembly 460 may be matched to the relative aperture without the conversion lens assembly 460 by constraining optical parameters of the second stack of lenses based on optical parameters of the first lens stack in the mother lens assembly.

Figure 5A:
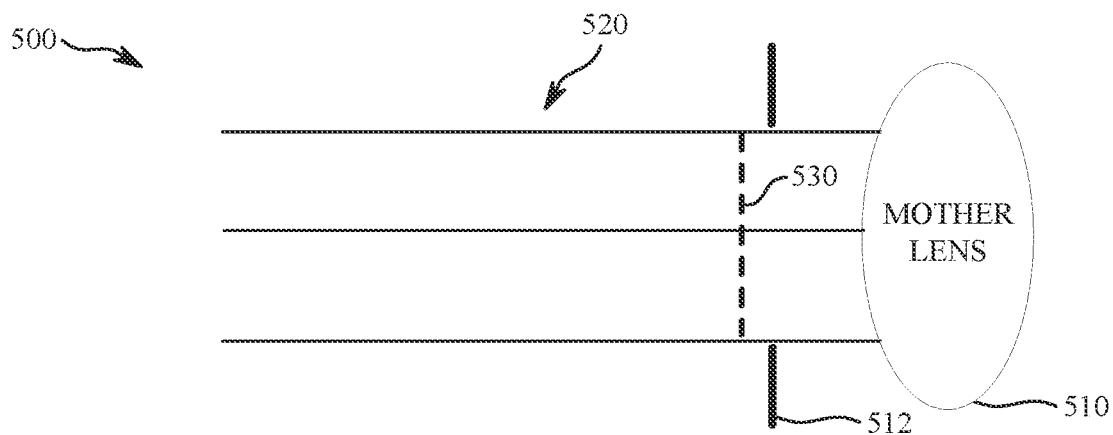
FIG. 5A is an illustration of an example of an entrance pupil of a mother lens assembly in an image capture device.
Figure 5B:
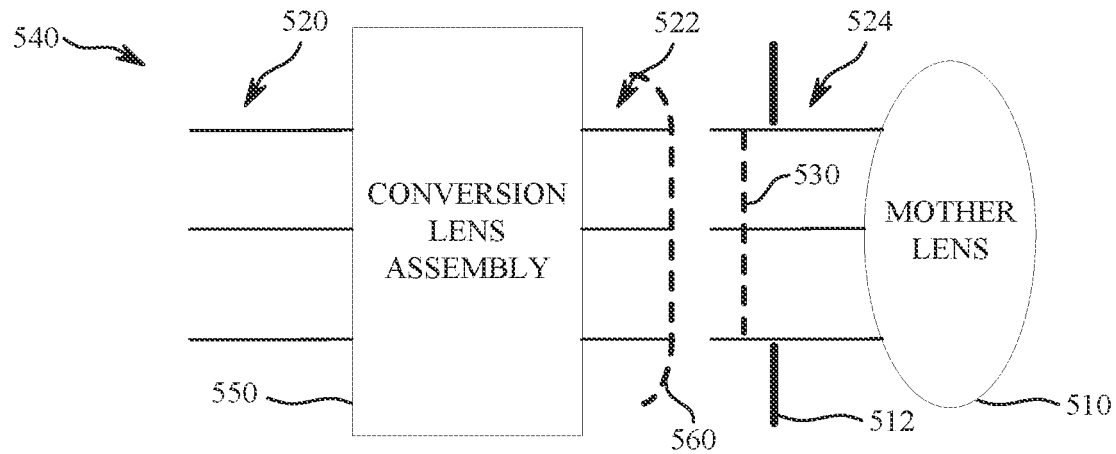
FIG. 5B is an illustration of an example of an exit pupil of a conversion lens assembly and a corresponding entrance pupil of a mother lens assembly in an image capture device.
Figure 5C:
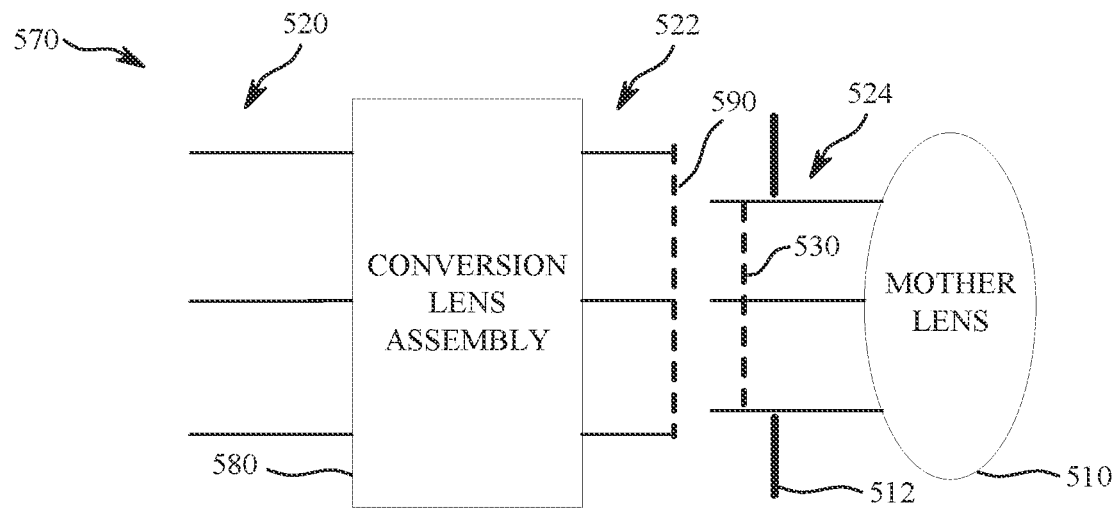
FIG. 5C is an illustration of an example of an exit pupil of a conversion lens assembly that is afocal and a corresponding entrance pupil of a mother lens assembly in an image capture device.

FIGS. 5A-C illustrate a principle for designing a conversion lens assembly to allow for a loose mounting tolerance while maintaining consistent image quality (e.g., consistent modulation transfer function (MTF) curves across a wide range of lateral mounting errors).

FIG. 5A is an illustration of an example of an entrance pupil of a mother lens assembly in an image capture device. In this first scenario 500, a mother lens assembly is used without a conversion lens assembly to capture an image. Light rays 520 are incident on a mother lens 510 by passing through an entrance pupil 512 of the mother lens assembly. For a mother lens 510, only the input wavefront 530 with a given size and shape, such as flat, meaning the object at infinity, can enter the mother lens 510 entrance pupil 512 and be focused on an image plane well. This may be the requirement of the mother lens 510 applicable to the conversion lens assembly. If the mother lens 510 is designed for infinity object distance, i.e., a flat wavefront 530, then for other shapes of wavefront, such as spherical, may indicate an object is at a finite distance, and the wavefront may then be defocused or focused poorly at the image plane. Similarly, regarding the wavefront size, only the portion of the wavefront that hits the entrance pupils will go through the mother lens 510 and be focused on the image plane.

FIG. 5B is an illustration of an example of an exit pupil of a conversion lens assembly and a corresponding entrance pupil of a mother lens assembly in an image capture device. In this second scenario 540, a mother lens assembly is used with a conversion lens assembly 550 to capture an image, but the conversion lens design (e.g., designed ignoring mount tolerance effects) causes only a portion of the output wavefront 560 from conversion lens assembly 550 to meet the above-mentioned requirements for the input wavefront 530 to the entrance pupil 512. Light rays 520 are incident on the conversion lens assembly 550, some lights rays 522 exit the conversion lens assembly 550, and some of these light rays 524 pass through the entrance pupil 512 of the mother lens assembly. In the second scenario 540, since there is no mounting error for the conversion lens assembly 550, a flat portion of the output wavefront 560 enters the entrance pupil 512 of the mother lens 510 as the input wavefront 530, goes through the mother lens 510 and is focused on an image plane without image degradation. However, the output wavefront 560 shape in other areas, such as that illustrated by the curved area of the output wavefront 560, will not meet the above-mentioned requirement. If the conversion lens assembly 550 is laterally translated (e.g., due to mounting errors or manufacturing tolerances of components), an unintended portion (e.g., the curved area) of the output wavefront 560 will enter the entrance pupil 512, go through the mother lens 510 and may be focused poorly/improperly on the image plane. For this reason, lateral mounting errors of the conversion lens assembly 550 may degrade image quality.

FIG. 5C is an illustration of an example of an exit pupil of a conversion lens assembly that is afocal and a corresponding entrance pupil of a mother lens assembly in an image capture device. In this third scenario 570, a mother lens assembly is used with a conversion lens assembly 580 to capture an image, and the conversion lens assembly 580 is afocal with an exit pupil sized such that an output wavefront 590 from conversion lens assembly 580 meets the above-mentioned requirements for the input wavefront 530 over a larger area than the entrance pupil 512 of the mother lens assembly. Light rays 520 are incident on the conversion lens assembly 580, some lights rays 522 exit the conversion lens assembly 580, and some of these light rays 524 pass through the entrance pupil 512 of the mother lens assembly. Because the quality area of the output wavefront 590 exceeds the area of the entrance pupil 512, if the conversion lens assembly 580 is laterally shifted (e.g., due to mounting errors or manufacturing tolerances of components), the wavefront shape that enters the entrance pupil 512 of the mother lens assembly still meets the above-mentioned requirements for the input wavefront 530, and the light will be focused on image plane as well as without the conversion lens assembly 580.

In FIGS. 5A-C, only the entrance pupil 512 for the on-axis field is depicted for clarity. The afocal design with exit pupil overfill of corresponding entrance pupils may be applied to all fields. For example, for some smartphone lenses, the stop aperture is located in front of the mother lens 510 and thus the entrance pupil 512 is the same for all fields. The design criteria for the conversion lens assembly 580 may be set to overfill this entrance pupil with all exit pupils from the conversion lens assembly 580, thus providing a margin or tolerance for mounting errors of the conversion lens assembly 580. Where an aperture stop is behind the mother lens 510, the entrance pupil will vary with field, and thus the design criteria for the desired level of overfill may be determined across a set of different entrance pupils for the mother lens assembly.

For example, an exit pupil of the conversion lens assembly 580 may be sized to overfill a corresponding entrance pupil of the mother lens assembly. In some implementations, an amount by which the exit pupil is sized to overfill the corresponding entrance pupil exceeds a mounting tolerance of the conversion lens mounting apparatus. In some implementations, an amount by which the exit pupil is sized to overfill the corresponding entrance pupil exceeds a manufacturing tolerance for alignment of the second lens stack to a portion of the conversion lens mounting apparatus. In some implementations, an amount by which the exit pupil is sized to overfill the corresponding entrance pupil exceeds a manufacturing tolerance for alignment of the first lens stack to a portion of the conversion lens mounting apparatus.

Figure 6A:
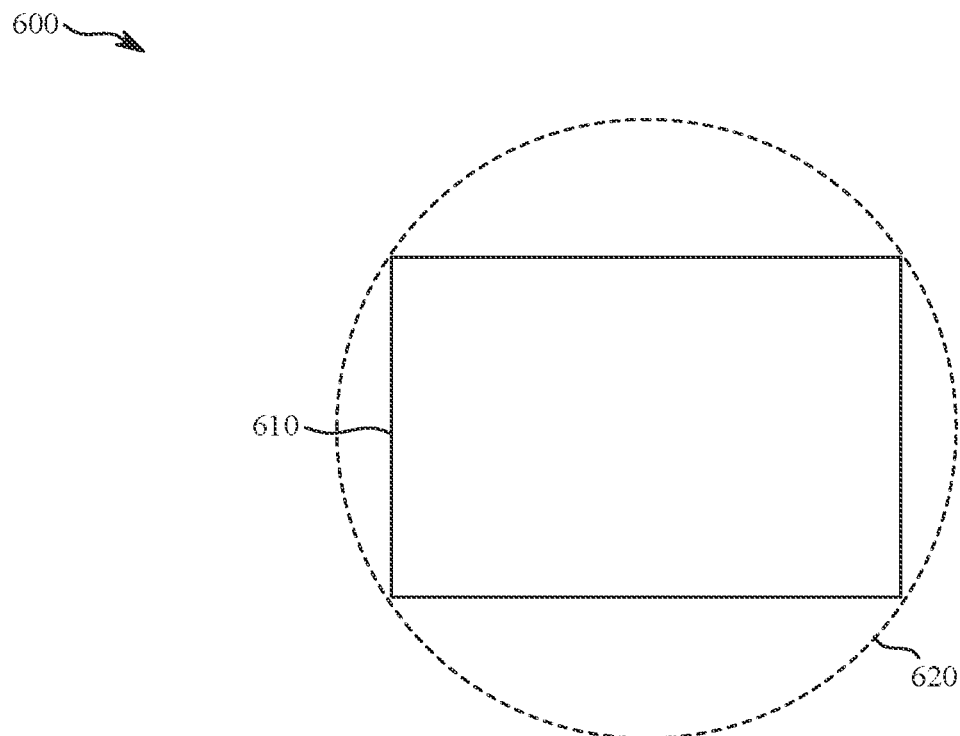
FIG. 6A is an illustration of an image sensor overlaid with an image circle corresponding to a field of view of a mother lens assembly.
Figure 6B:
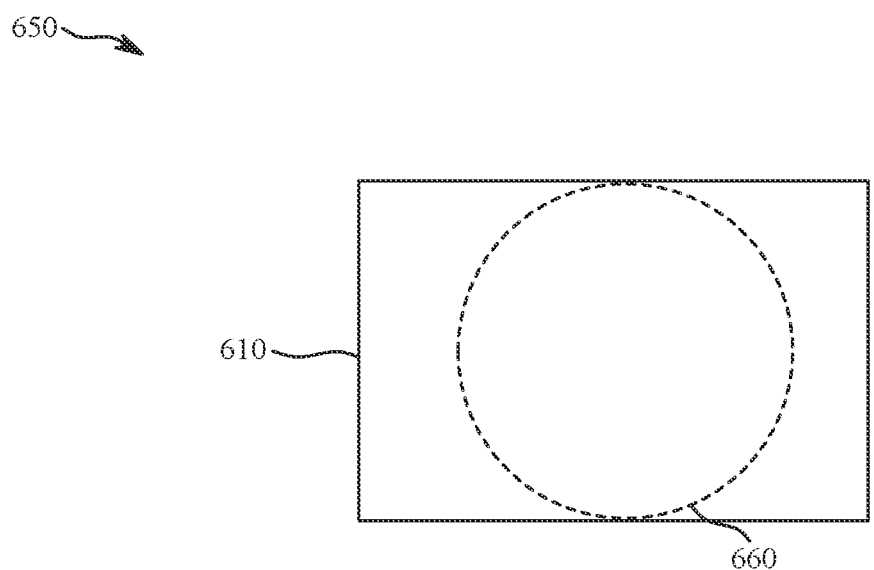
FIG. 6B is an illustration of an image sensor overlaid with an image circle corresponding to a field of view of a conversion lens assembly combined with a mother lens assembly.

FIGS. 6A-B depict modification of an image circle in an image capture device with an attachable and detachable, high quality imaging lens system able to provide two different angular fields of view and magnifications.

FIG. 6A is an illustration of an image sensor 610 overlaid with an image circle 620 corresponding to a field of view of a mother lens assembly. In this first usage scenario 600, an image is being captured using only a mother lens assembly to refract the sensed light. For example, the image sensor may have a sensor format of 1/2.3 inches or a sensor format of ⅔ inches. For example, the image sensor 610 may be part of a camera with a mother lens configured to can provide high quality and stabilized image with an angular field of view of about 95.2 degree (V)×123.6 degree (H)×153 degree (D). To get super high-smooth mode imaging, it may be highly desired to design a camera and its lens with larger angular field of view (FOV), (e.g., a 175 degree and an image circle inscribed in two long sides of the image sensor 610, as illustrated in FIG. 6B. One approach is designing a completely new lens and camera is a way. Another approach is to design a conversion lens assembly (e.g., an accessary lens). This accessary lens can be attached and detached from the main camera easily. When this conversion lens assembly (e.g., the conversion lens assembly 460 is attached to the main camera (e.g., using the conversion lens mounting apparatus 470), it converts the original lens system to a larger angular FOV and smaller image format. This way, users have more flexibility to choose the camera mode appropriate to a usage scenario.

This application describes a lens system which is composed of two physically separable lens assemblies. One, called a mother lens assembly, is permanently embedded in the camera and provides a smaller angular FOV and larger image format. Another is an accessory lens, called the conversion lens assembly. This conversion lens assembly, when attached to the camera, may provide a larger angular FOV and smaller image format. This conversion lens assembly may be designed in such a way that the image quality of the combined lens system is insensitive to mounting errors of the conversion lens assembly. In addition, the conversion lens assembly may be designed in such a way that the best image plane doesn't change with or without conversion lens assembly and the relative aperture doesn't change with or without conversion lens assembly.

FIG. 6B is an illustration of the image sensor 610 overlaid with an image circle 660 corresponding to a field of view of a conversion lens assembly combined with a mother lens assembly. In this second usage scenario 650, an image is being captured using a combination of a conversion lens assembly and the mother lens assembly to refract the sensed light to the image sensor 610. The image sensor 610 is part of image capture device that includes a mother lens assembly including a first stack of lenses; the image sensor 610 positioned at a first end of the mother lens assembly and configured to detect images based on light incident on the image sensor 610 through the first stack of lenses; a conversion lens assembly including a second stack of lenses; and a conversion lens mounting apparatus configured to removably attach the conversion lens assembly to the image capture device in a position over a second end of the mother lens assembly, opposite from the image sensor 610, such that light incident on an outer lens of the second stack of lenses will be refracted through the second stack of lenses and the first stack of lenses to the image sensor 610. In this second usage scenario 650, the image circle 660 of the second lens stack combined with the first lens stack, when the conversion lens assembly is attached to the image capture device, is inscribed within a light sensitive area of the image sensor 610. In some implementations, a best image plane of the second lens stack combined with the first lens stack, when the conversion lens assembly is attached to the image capture device, is the same as a best image plane of the first lens stack alone, when the conversion lens assembly is removed from the image capture device. In some implementations, a relative aperture of the second lens stack combined with the first lens stack, when the conversion lens assembly is attached to the image capture device, is the same as a relative aperture of the first lens stack alone, when the conversion lens assembly is removed from the image capture device.

In the first usage scenario 600 of FIG. 6A, the image circle 620 of the first lens stack alone, when the conversion lens assembly is removed from the image capture device, encompasses a light sensitive area of the image sensor 610. The conversion lens assembly may have a wider field of view than the mother lens assembly. For example, the image circle 620 of FIG. 6A may correspond to a 153 degree diagonal field of view, while the image circle 660 of FIG. 6B may correspond to a 175 degree diagonal field of view.

Figure 7:
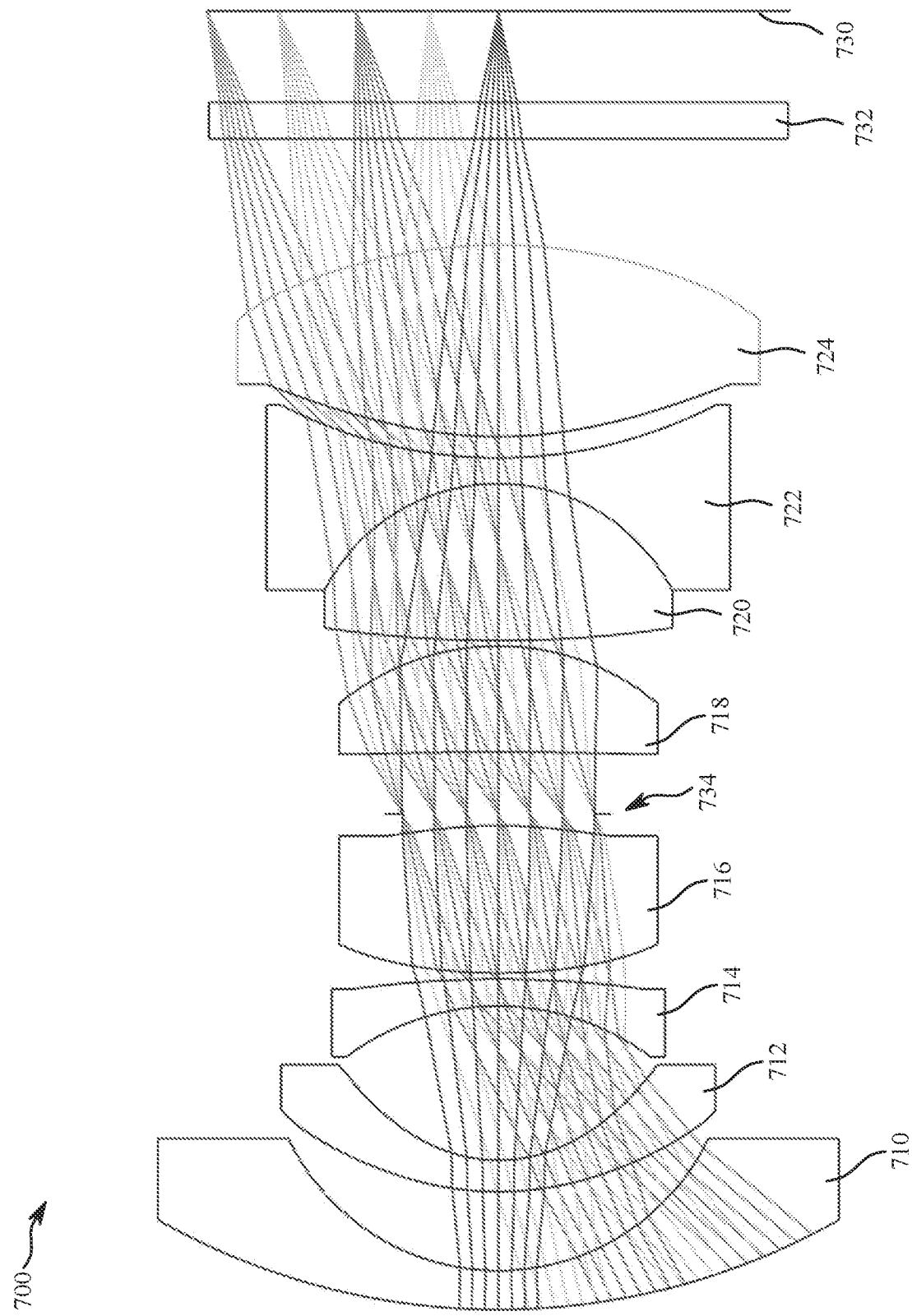
FIG. 7 is an illustration of an example of a lens stack of a mother lens assembly.

FIG. 7 is an illustration of an example of a lens stack of a mother lens assembly 700. The mother lens assembly 700 includes a stack of lenses, from outer to inner, including an L1 lens 710, an L2 lens 712, an L3 lens 714, an L4 lens 716, an L5 lens 718, an L6 lens 720, an L7 lens 722, and an L8 lens 724. The stack of lenses (710-724) is configured to focus light incident on the L1 lens 710 on an image plane 730, which may correspond to light sensitive surface of an image sensor (e.g., the image sensor 420). The refracted light also passes through a sensor cover glass 732 and an aperture stop 734 positioned between the L4 lens 716 and the L5 lens 718.

For example, the mother lens assembly 700 may have a total track length of 18 millimeters (mm), an relative aperture (F/#) of 2.5, a focal length of 2.711 mm, a design wavelength of 455 nanometers (nm) to 661 nm, a sensor format of 1/2.3 inches, an angular field of view of 95.2° (V)×123.6° (H)×153° (D); an image circle of 7.85 mm, and a chief ray angle of 15° at maximum image circle.

The fundamental structure of the mother lens assembly 700 is a reverse telephoto lens with symmetric configuration about the aperture stop. Hence, the third order astigmatism, third order field curvature and third order lateral color can be roughly cancelled out. The asphere terms of the L8 lens 724 may be used to get specified chief ray angles. Negative elements L1 lens 710 and L2 lens 712 may be used to reduce the pupil aberration. The L1 lens 710, L3 lens 714, L5 lens 718, L6 lens 720 and L7 lens 722 are spherical elements. The L2 lens 712, L4 lens 716 and L8 lens 724 are aspherical elements. The L1 lens 710, L2 lens 712, L3 lens 714, L4 lens 716, L5 lens 718, L6 lens 720, L7 lens 722, and L8 lens 724 may be made of glasses (e.g., with H-ZLAF75A ($n_d$=1.904, $v_d$=31.3), MC-FCD1-M20 ($n_d$=1.497, $v_d$=81.5), H-K9L ($n_d$=1.517, $v_d$=64.2), MC-TAFD307 ($n_d$=1.882, $v_d$=37.2), H-FK61B ($n_d$=1.491, $v_d$=81.6), H-ZPK2 ($n_d$=1.603, $v_d$=65.5), H-ZF50 ($n_d$=1.741, $v_d$=27.8) and MC-FCD1-M20 ($n_d$=1.497, $v_d$=81.5) respectively). In some implementations, these glasses may be replaced with index and abbe numbers. The material of the L1 lens 710 may be made of harder glass to have better anti-scratch quality.

For example, the L1 lens 710 may be spherical and made from H-ZLAF75A (with index of refraction 1.904 and abbe number 31.3) with an outer (object side) radius of curvature of 9.49736415 millimeters (mm), an outer clear semi-diameter of 4.70000000, an inner (sensor side) radius of curvature of 3.21222787 mm, an inner clear semi-diameter of 2.90000000, and a center thickness of 0.540100 mm. The air gap between the L1 lens 710 and the L2 lens 712 has a center thickness of 1.095871 mm. For example, the L2 lens 712 may be even aspherical and made from MC-FCD1-M20 (with index of refraction 1.497 and abbe number 81.5) with an outer (object side) radius of curvature of 4.40140323 mm, an outer clear semi-diameter of 3.00000000, an outer conic constant of 0.820148, an outer 4th order coefficient of $1.872683\times10^{\wedge}-3$, an outer $6^{th}$ order coefficient of $-2.20047988\times10^{\wedge}-3$, an outer $8^{th}$ order coefficient of $4.286681\times10^{\wedge}-4$, an outer $10^{th}$ order coefficient of $-4.468952\times10^{\wedge}-5$, an outer $12^{th}$ order coefficient of $1.773196\times10^{\wedge}-6$, an inner (sensor side) radius of curvature of 2.10529873 mm, an inner clear semi-diameter of 2.20000000, an inner conic constant of −0.542206, an inner $4^{th}$ order coefficient of $5.324835\times10^{\wedge}-3$, an inner $6^{th}$ order coefficient of $-2.81974387\times10^{\wedge}-3$, an inner $8^{th}$ order coefficient of $3.350900\times10^{\wedge}-4$, an inner $10^{th}$ order coefficient of $5.740625\times10^{\wedge}-5$, an inner $12^{th}$ order coefficient of $-1.286993\times10^{\wedge}-5$, and a center thickness of 0.436021 mm. The air gap between the L2 lens 712 and the L3 lens 714 has a center thickness of 2.133758 mm. For example, the L3 lens 714 may be spherical and made from H-K9L (with index of refraction 1.517 and abbe number 64.2) with an outer (object side) radius of curvature of −3.48837677 mm, an outer clear semi-diameter of 2.10000000, an inner (sensor side) radius of curvature of −14.84280098 mm, an inner clear semi-diameter of 2.00000000, and a center thickness of 0.374719 mm. The air gap between the L3 lens 714 and the L4 lens 716 has a center thickness of 0.083910 mm. For example, the L4 lens 716 may be even aspherical and made from MC-TAFD307 (with index of refraction 1.882 and abbe number 37.2) with an outer (object side) radius of curvature of 7.21888162 mm, an outer clear semi-diameter of 2.20000000, an outer conic constant of 2.102011, an outer $4^{th}$ order coefficient of $1.150114\times10^{\wedge}-4$, an outer $6^{th}$ order coefficient of $8.208919\times10^{\wedge}-5$, an outer $8^{th}$ order coefficient of $1.018711\times10^{\wedge}-4$, an outer $10^{th}$ order coefficient of $-2.736738\times10^{\wedge}-5$, an outer $12^{th}$ order coefficient of $3.415871\times10^{\wedge}-6$, an inner (sensor side) radius of curvature of −6.92894328 mm, an inner clear semi-diameter of 1.53080015, an inner conic constant of 14.597079, an inner $4^{th}$ order coefficient of 0.010338, an inner $6^{th}$ order coefficient of $9.473713\times10^{\wedge}-4$, an inner $8^{th}$ order coefficient of $9.976586\times10^{\wedge}-4$, an inner $10^{th}$ order coefficient of $-5.270709\times10^{\wedge}-4$, an inner $12^{th}$ order coefficient of $1.633868\times10^{\wedge}-4$, and a center thickness of 2.043145 mm. The air gap between the L4 lens 716 and the L5 lens 718 has a center thickness of 0.161574 mm. For example, the aperture stop 734 may have thickness of 0.859133 mm and a clear semi-diameter of 1.32600000. For example, the L5 lens 718 may be spherical and made from H-FK61B (with index of refraction 1.491 and abbe number 81.6) with an outer (object side) radius of curvature of −58.89618128 mm, an outer clear semi-diameter of 1.80000000, an inner (sensor side) radius of curvature of −3.43121656 mm, an inner clear semi-diameter of 2.20000000, and a center thickness of 1.469225 mm. The air gap between the L5 lens 718 and the L6 lens 720 has a center thickness of 0.077602 mm. For example, the L6 lens 720 may be spherical and made from H-ZPK2A (with index of refraction 1.603 and abbe number 65.5) with an outer (object side) radius of curvature of 16.53944085 mm, an outer clear semi-diameter of 2.40000000, an inner (sensor side) radius of curvature of −2.68988785 mm, an inner clear semi-diameter of 2.40000000, and a center thickness of 2.172732 mm. For example, the L7 lens 722 may be spherical and made from H-ZF50 (with index of refraction 1.741 and abbe number 27.8) with an outer (object side) radius of curvature of −2.68988785 mm, an outer clear semi-diameter of 2.40000000, an inner (sensor side) radius of curvature of 6.49948177 mm, an inner clear semi-diameter of 3.00000000, and a center thickness of 0.358236 mm. The air gap between the L7 lens 722 and the L8 lens 724 has a center thickness of 0.294461 mm. For example, the L8 lens 724 may be even aspherical and made from MC-FCD1-M20 (with index of refraction 1.497 and abbe number 81.5) with an outer (object side) radius of curvature of 5.89752468 mm, an outer clear semi-diameter of 3.20000000, an outer conic constant of 0.933104, an outer $4^{th}$ order coefficient of $-3.28534081\times10^{\wedge}-3$, an outer $6^{th}$ order coefficient of $1.101686\times10^{\wedge}-4$, an outer $8^{th}$ order coefficient of $-1.04554681\times10^{\wedge}-5$, an outer $10^{th}$ order coefficient of $-2.316863\times10^{\wedge}-8$, an outer $12^{th}$ order coefficient of $1.899045\times10^{\wedge}-8$, an inner (sensor side) radius of curvature of −6.65269847 mm, an inner clear semi-diameter of 3.60000000, an inner conic constant of −1.605373, an inner $4^{th}$ order coefficient of $1.286707\times10^{\wedge}-3$, an inner $6^{th}$ order coefficient of $-2.69852468\times10^{\wedge}-4$, an inner $8^{th}$ order coefficient of $3.488667\times10^{\wedge}-5$, an inner $10^{th}$ order coefficient of $-3.167066\times10^{\wedge}-6$, an inner $12^{th}$ order coefficient of $9.373795\times10^{\wedge}-8$, and a center thickness of 2.659567 mm. The air gap between the L8 lens 724 and the sensor cover glass 732 has a center thickness of 1.472662 mm. The sensor cover glass 732 may be made from H-K9L (with index of refraction 1.517 and abbe number 64.2) and has a thickness of 0.500000 mm and a clear semi-diameter of 4.00000000. The air gap between the sensor cover glass 732 and the image plane 730 has thickness of 1.26732 mm.

Figure 8:
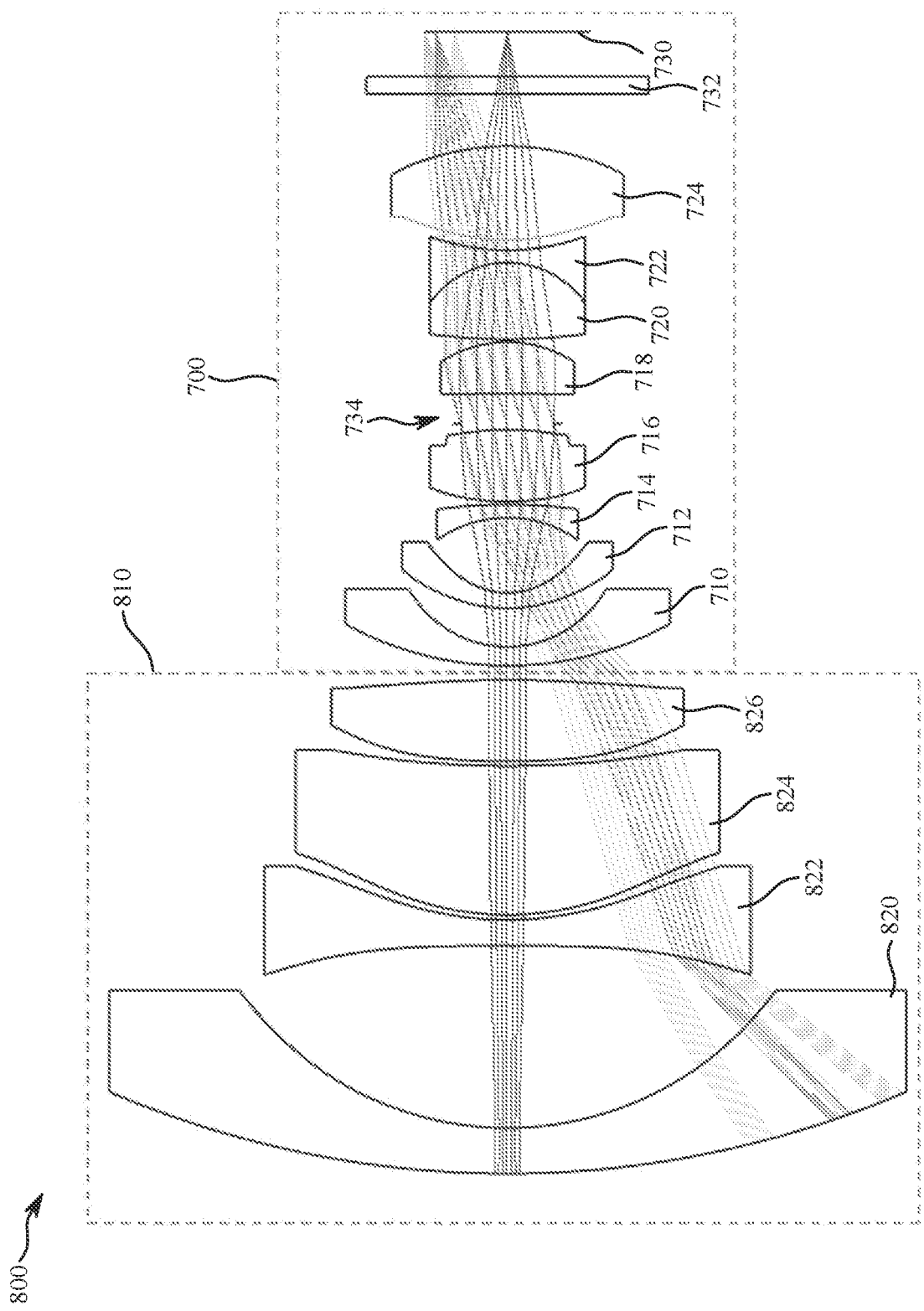
FIG. 8 is an illustration of an example of a combination of lens stacks of a conversion lens assembly and a mother lens assembly.

FIG. 8 is an illustration of an example of a combination of lens stacks 800 of a conversion lens assembly 810 and the mother lens assembly 700. The conversion lens assembly 810 is positioned at an end of the mother lens assembly 700, opposite from the image plane 730. The conversion lens assembly 810 includes a stack of lenses, from outer to inner, including an L1 lens 820; an L2 lens 822, and L3 lens 824, and an L4 lens 826. The stack of lenses (820-826) is configured to refract light incident on the L1 lens 820 on to the L1 lens 710 of the mother lens assembly 700.

For example, the combination of lens stacks 800 of a conversion lens assembly 810 and the mother lens assembly 700 may have a total track length of 32.42 millimeters (mm), an relative aperture (F/#) of 2.5, a focal length of 1.79 mm, a design wavelength of 455 nanometers (nm) to 661 nm, a sensor format of 1/2.3 inches, an angular field of view of 175°; an image circle of 4.73 mm, and a chief ray angle of 15° at maximum image circle. Thus, the combination of lens stacks 800 of a conversion lens assembly 810 and the mother lens assembly 700 may convert a 146° angular field of view and image circle of 8 mm to a 175° angular FOV and 4.75 mm image circle.

The negative element, L1 lens 820, may be primarily used to reduce the pupil aberration, which, in return, may help to improve the relative illumination. In addition, the shape of the L1 lens 820 may also used to reduce the angle of incidence on the outermost surface, which, in return, to improve the relative illumination. The L1 lens 820 is a spherical element. The L2 lens 822, L3 lens 824 and L4 lens 826 are aspherical elements. The L1 lens 820, L2 lens 822, L3 lens 824 and L4 lens 826 are all made of glasses (e.g., with H-ZLAF55D, D-LAK6, D-ZF10 and MC-LAC130 respectively). In some implementations, these glasses will be replaced with index and abbe numbers. The material of the L1 lens 820 may be made of harder glass to have better anti-scratch quality.

For example, the L1 lens 820 may be spherical and made from H-ZLAF55D (with index of refraction 1.835 and abbe number 42.7) with an outer (object side) radius of curvature of 28.582899 millimeters (mm), an outer clear semi-diameter of 11.30000000, an inner (sensor side) radius of curvature of 9.346412 mm, an inner clear semi-diameter of 7.60000000, and a center thickness of 1.297369 mm. The air gap between the L1 lens 820 and the L2 lens 822 has a center thickness of 5.170662 mm. For example, the L2 lens 822 may be even aspherical and made from D-LAK6 (with index of refraction 1.694 and abbe number 53.2) with an outer (object side) radius of curvature of −234.237715 mm, an outer clear semi-diameter of 6.90000000, an outer conic constant of 0.000000, an outer $4^{th}$ order coefficient of −6.006843×10$^\wedge$−4, an outer $6^{th}$ order coefficient of 8.304294×10$^\wedge$−6, an outer 8th order coefficient of −6.623375×10$^\wedge$−8, an outer $10^{th}$ order coefficient of 3.557178×10$^\wedge$−10, an outer $12^{th}$ order coefficient of 0.000000, an inner (sensor side) radius of curvature of 9.417115 mm, an inner clear semi-diameter of 6.00000000, an inner conic constant of 0.000000, an inner $4^{th}$ order coefficient of −3.065922×10$^\wedge$−4, an inner $6^{th}$ order coefficient of 6.231223×10$^\wedge$−6, an inner $8^{th}$ order coefficient of −6.457357×10$^\wedge$−7, an inner $10^{th}$ order coefficient of 9.106986×10$^\wedge$−9, an inner $12^{th}$ order coefficient of 0.000000, and a center thickness of 0.739228 mm. The air gap between the L2 lens 822 and the L3 lens 824 has a center thickness of 0.140128 mm. For example, the L3 lens 824 may be even aspherical and made from D-ZF10 (with index of refraction 1.689 and abbe number 31.1) with an outer (object side) radius of curvature of 8.111370 mm, an outer clear semi-diameter of 6.00000000, an outer conic constant of −0.382550, an outer $4^{th}$ order coefficient of −9.080117×10$^\wedge$−5, an outer $6^{th}$ order coefficient of −3.698359×10$^\wedge$−6, an outer $8^{th}$ order coefficient of −6.239522×10$^\wedge$−7, an outer $10^{th}$ order coefficient of 1.291816×10$^\wedge$−8, an outer $12^{th}$ order coefficient of −5.935574×10$^\wedge$−11, an inner (sensor side) radius of curvature of 25.396013 mm, an inner clear semi-diameter of 5.00000000, an inner conic constant of 7.330400, an inner $4^{th}$ order coefficient of −7.017480×10$^\wedge$−4, an inner $6^{th}$ order coefficient of 7.097469×10$^\wedge$−5, an inner $8^{th}$ order coefficient of −3.087901×10$^\wedge$−6, an inner $10^{th}$ order coefficient of 5.105846×10$^\wedge$−8, an inner $12^{th}$ order coefficient of −2.070343×10$^\wedge$−10, and a center thickness of 4.231515 mm. The air gap between the L3 lens 824 and the L4 lens 826 has a center thickness of 0.129236 mm. For example, the L4 lens 826 may be even aspherical and made from MC-LAC130 (with index of refraction 1.694 and abbe number 53.2) with an outer (object side) radius of curvature of 23.270760 mm, an outer clear semi-diameter of 5.00000000, an outer conic constant of −5.289071, an outer $4^{th}$ order coefficient of 6.816483×10$^\wedge$−4, an outer $6^{th}$ order coefficient of 3.688348×10$^\wedge$−5, an outer $8^{th}$ order coefficient of −1.188804×10$^\wedge$−6, an outer $10^{th}$ order coefficient of −2.457534×10$^\wedge$−8, an outer $12^{th}$ order coefficient of 9.101118×10$^\wedge$−10, an inner (sensor side) radius of curvature of −26.342266 mm, an inner clear semi-diameter of 4.60000000, an inner conic constant of 9.442880, an inner $4^{th}$ order coefficient of 9.120000×10$^\wedge$−4, an inner $6^{th}$ order coefficient of −4.742257×10$^\wedge$−5, an inner $8^{th}$ order coefficient of 2.413569×10$^\wedge$−6, an inner $10^{th}$ order coefficient of −8.141598×10$^\wedge$−8, an inner $12^{th}$ order coefficient of 1.133361×10$^\wedge$−9, and a center thickness of 2.316485 mm. The air gap between the L4 lens 826 and the mother lens assembly 700 has a center thickness of 0.400000 mm.

Figure 9:
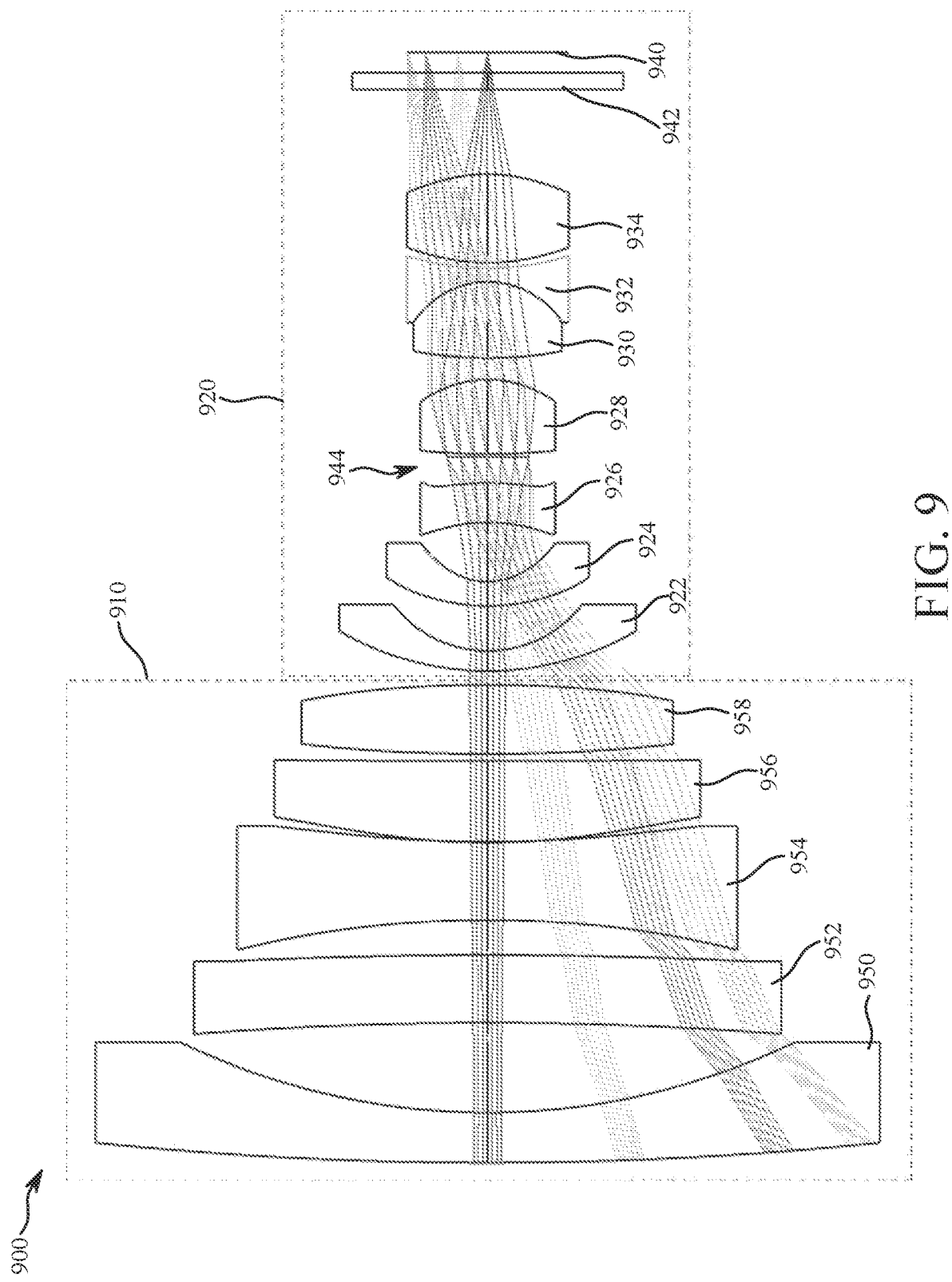
FIG. 9 is an illustration of an example of a combination of lens stacks of a conversion lens assembly and a mother lens assembly.

FIG. 9 is an illustration of an example of a combination of lens stacks 900 of a conversion lens assembly 910 and a mother lens assembly 920. The conversion lens assembly 910 is positioned at an end of the mother lens assembly 920, opposite from an image plane 940 onto which light is focused for image capture. The mother lens assembly 920 includes a stack of lenses, from outer to inner, including an L1 lens 922; an L2 lens 924, and L3 lens 926, an L4 lens 928, an L5 lens 930, an L6 lens 932, and an L7 lens 934. The stack of lenses (922-934 is configured to focus light incident on the L1 lens 922 on the image plane 940, which may correspond to light sensitive surface of an image sensor (e.g., the image sensor 420). The refracted light also passes through a sensor cover glass 942 and an aperture stop 944 positioned between the L3 lens 926 and the L4 lens 928. The conversion lens assembly 910 includes a stack of lenses, from outer to inner, including an L1 lens 950; an L2 lens 952, and L3 lens 954, an L4 lens 956, and an L5 lens 958. The stack of lenses (950-958) is configured to refract light incident on the L1 lens 950 on to the L1 lens 922 of the mother lens assembly 920.

For example, the combination of lens stacks 900 of a conversion lens assembly 910 and the mother lens assembly 920 may have a relative aperture (F/#) of 2.6 and a design wavelength of 455 nanometers (nm) to 661 nm. The combination of lens stacks 900 of a conversion lens assembly 910 and the mother lens assembly 920 may convert a 146° angular field of view and image circle of 8 mm to a 175° angular FOV and 4.75 mm image circle.

For example, the L1 lens 922 may be spherical and made from H-LAK52 (with index of refraction 1.729 and abbe number 54.7) with an outer (object side) radius of curvature of 8.70939958 millimeters (mm), an outer clear semi-diameter of 5.20000000, an inner (sensor side) radius of curvature of 3.56684622 mm, an inner clear semi-diameter of 3.30000000, and a center thickness of 0.60000000 mm. The air gap between the L1 lens 922 and the L2 lens 924 has a center thickness of 1.31369248 mm. For example, the L2 lens 924 may be even aspherical and made from M-FCD1 (with index of refraction 1.497 and abbe number 81.6) with an outer (object side) radius of curvature of 5.65209389 mm, an outer clear semi-diameter of 3.20000000, an outer conic constant of 1.44139433, an outer $4^{th}$ order coefficient of −4.59278524×10$^\wedge$−3, an outer $6^{th}$ order coefficient of 4.84077603×10$^\wedge$−4, an outer $8^{th}$ order coefficient of −3.32318588×10$^\wedge$−5, an outer $10^{th}$ order coefficient of 9.45397400×10$^\wedge$−7, an inner (sensor side) radius of curvature of 2.00423180 mm, an inner clear semi-diameter of 2.10000000, an inner conic constant of −0.67184274, an inner $4^{th}$ order coefficient of −2.02128287×10$^\wedge$−3, an inner $6^{th}$ order coefficient of 3.72088346×10$^\wedge$−4, an inner $8^{th}$ order coefficient of 2.00807798×10$^\wedge$−4, an inner $10^{th}$ order coefficient of −2.31692691×10$^\wedge$−6, and a center thickness of 0.70000000 mm. The air gap between the L2 lens 924 and the L3 lens 926 has a center thickness of 1.72813154 mm.

For example, the L3 lens 926 may be even aspherical and made from M-TAFD305 (with index of refraction 1.851 and abbe number 40.1) with an outer (object side) radius of curvature of −5.42122861 mm, an outer clear semi-diameter of 2.00000000, an outer conic constant of 1.85713465, an outer 4th order coefficient of −4.82104127×10^−3, an outer $6^{th}$ order coefficient of 2.09207939×10^−3, an outer $8^{th}$ order coefficient of −6.40621133×10^−5, an outer $10^{th}$ order coefficient of 0.0000000, an inner (sensor side) radius of curvature of −7.20730301 mm, an inner clear semi-diameter of 2.00000000, an inner conic constant of −4.36076383, an inner $4^{th}$ order coefficient of 1.84863366×10^−3, an inner $6^{th}$ order coefficient of 3.73504961×10^−3, an inner $8^{th}$ order coefficient of −8.21828575×10^−4, an inner $10^{th}$ order coefficient of 2.82263215×10^−4, and a center thickness of 1.15277270 mm. The air gap between the L3 lens 926 and the L4 lens 928 has a center thickness of 0.75084797 mm. For example, the aperture stop 944 may have thickness of 0.08908569 mm and a clear semi-diameter of 1.21260000. For example, the L4 lens 928 may be spherical and made from H-LAK52 (with index of refraction 1.729 and abbe number 54.7) with an outer (object side) radius of curvature of 19.825340439 millimeters (mm), an outer clear semi-diameter of 1.50000000, an inner (sensor side) radius of curvature of −3.37704000 mm, an inner clear semi-diameter of 2.00000000, and a center thickness of 2.18000000 mm. The air gap between the L4 lens 928 and the L5 lens 930 has a center thickness of 0.63075491 mm. For example, the L5 lens 930 may be spherical and made from FCD10A (with index of refraction 1.459 and abbe number 90.2) with an outer (object side) radius of curvature of 12.10849785 millimeters (mm), an outer clear semi-diameter of 2.30000000, an inner (sensor side) radius of curvature of −2.63432238 mm, an inner clear semi-diameter of 2.30000000, and a center thickness of 2.21500000 mm. For example, the L6 lens 932 may be spherical and made from H-ZF11 (with index of refraction 1.699 and abbe number 30.1) with an outer (object side) radius of curvature of −2.63432238 millimeters (mm), an outer clear semi-diameter of 2.30000000, an inner (sensor side) radius of curvature of 8.25340439 mm, an inner clear semi-diameter of 2.80000000, and a center thickness of 2.40000000 mm. The air gap between the L6 lens 932 and the L7 lens 934 has a center thickness of 0.15957414 mm. For example, the L7 lens 934 may be even aspherical and made from M-FCD1 (with index of refraction 1.497 and abbe number 81.6) with an outer (object side) radius of curvature of 5.99484063 mm, an outer clear semi-diameter of 3.40000000, an outer conic constant of −6.68959873, an outer $4^{th}$ order coefficient of 1.31181301×10^−3, an outer $6^{th}$ order coefficient of −3.59814344×10^−5, an outer $8^{th}$ order coefficient of 1.64320946×10^−6, an outer $10^{th}$ order coefficient of −4.35500207×10^−7, an inner (sensor side) radius of curvature of −4.74375017 mm, an inner clear semi-diameter of 3.50000000, an inner conic constant of 0.46708052, an inner $4^{th}$ order coefficient of 3.85196164×10^−3, an inner $6^{th}$ order coefficient of −1.77306788×10^−6, an inner $8^{th}$ order coefficient of 7.48252985×10^−6, an inner $10^{th}$ order coefficient of −4.90578581×10^−7, and a center thickness of 2.58957979 mm. The air gap between the L7 lens 934 and the sensor cover glass 942 has a center thickness of 2.45980767 mm. The sensor cover glass 942 may be made from H-K9L (with index of refraction 1.517 and abbe number 64.2) and has a thickness of 0.500000 mm and a clear semi-diameter of 4.00000000. The air gap between the sensor cover glass 942 and the image plane 940 has thickness of 0.57666464 mm.

For example, the L1 lens 950 may be spherical and made from S-LAM60 (with index of refraction 1.743 and abbe number 49.3) with an outer (object side) radius of curvature of 116.213431 millimeters (mm), an inner (sensor side) radius of curvature of 21.198258 mm, and a center thickness of 1.473042 mm. The air gap between the L1 lens 950 and the L2 lens 952 has a center thickness of 2.612586 mm. For example, the L2 lens 952 may be spherical and made from L-LAH84P (with index of refraction 1.812 and abbe number 40.3) with an outer (object side) radius of curvature of −117.475051 millimeters (mm), an inner (sensor side) radius of curvature of −165.438594 mm, and a center thickness of 1.972658 mm. The air gap between the L2 lens 952 and the L3 lens 954 has a center thickness of 1.016621 mm. For example, the L3 lens 954 may be even aspherical and made from S-LAH52 (with index of refraction 1.800 and abbe number 42.2) with an outer (object side) radius of curvature of −34.530538 mm, an outer conic constant of 4.262552, an outer 4th order coefficient of −1.517641×10^−5, an outer $6^{th}$ order coefficient of 9.830603×10^−8, an outer $8^{th}$ order coefficient of 1.048213×10^−9, an outer $10^{th}$ order coefficient of 7.844601×10^−12, an outer $12^{th}$ order coefficient of −6.821999×10^−14, an inner (sensor side) radius of curvature of 35.905957 mm, an inner conic constant of 7.010751, an inner $4^{th}$ order coefficient of −8.243871×10^−5, an inner $6^{th}$ order coefficient of −3.146310×10^−8, an inner 8th order coefficient of −1.368934×10^−9, an inner $10^{th}$ order coefficient of −2.305566×10^−11, an inner $12^{th}$ order coefficient of 5.504108×10^−14, and a center thickness of 2.291794 mm. The air gap between the L3 lens 954 and the L4 lens 956 has a center thickness of 0.021 mm. For example, the L4 lens 956 may be even aspherical and made from S-NBH55 (with index of refraction 1.80 and abbe number 29.8) with an outer (object side) radius of curvature of 21.028761 mm, an outer conic constant of −4.027318, an outer $4^{th}$ order coefficient of −4.907778×10^−5, an outer $6^{th}$ order coefficient of −8.433146×10^−7, an outer $8^{th}$ order coefficient of −3.782694×10^−9, an outer $10^{th}$ order coefficient of −1.757296×10^−11, an outer $12^{th}$ order coefficient of −5.096956×10^−13, an inner (sensor side) radius of curvature of −1.088825×10^−8 mm, an inner conic constant of −4.027318, an inner $4^{th}$ order coefficient of 5.000605×10^−6, an inner $6^{th}$ order coefficient of 2.303489×10^−7, an inner $8^{th}$ order coefficient of 3.847545×10^−9, an inner $10^{th}$ order coefficient of −3.055654×10^−12, an inner $12^{th}$ order coefficient of 8.830747×10^−13, and a center thickness of 2.381920 mm. The air gap between the L4 lens 956 and the L5 lens 958 has a center thickness of 0.200767 mm. For example, the L5 lens 958 may be even aspherical and made from LAL56 (with index of refraction 1.678 and abbe number 50.7) with an outer (object side) radius of curvature of 57.842455 mm, an outer conic constant of 26.483279, an outer $4^{th}$ order coefficient of 6.427073×10^−6, an outer $6^{th}$ order coefficient of 5.981782×10^−8, an outer $8^{th}$ order coefficient of 1.986217×10^−9, an outer $10^{th}$ order coefficient of −5.648558×10^−11, an outer $12^{th}$ order coefficient of −1.109226×10^−12, an inner (sensor side) radius of curvature of −39.491579 mm, an inner conic constant of 21.519781, an inner $4^{th}$ order coefficient of −2.570974×10^−5, an inner $6^{th}$ order coefficient of −4.066230×10^−7, an inner $8^{th}$ order coefficient of 6.249269×10^−9, an inner $10^{th}$ order coefficient of −4.008676×10^−11, an inner $12^{th}$ order coefficient of −1.304408×10^−12, and a center thickness of 2.011961 mm. The air gap between the L5 lens 958 and the mother lens assembly 920 has a center thickness of 0.400000 mm.

Figure 10:
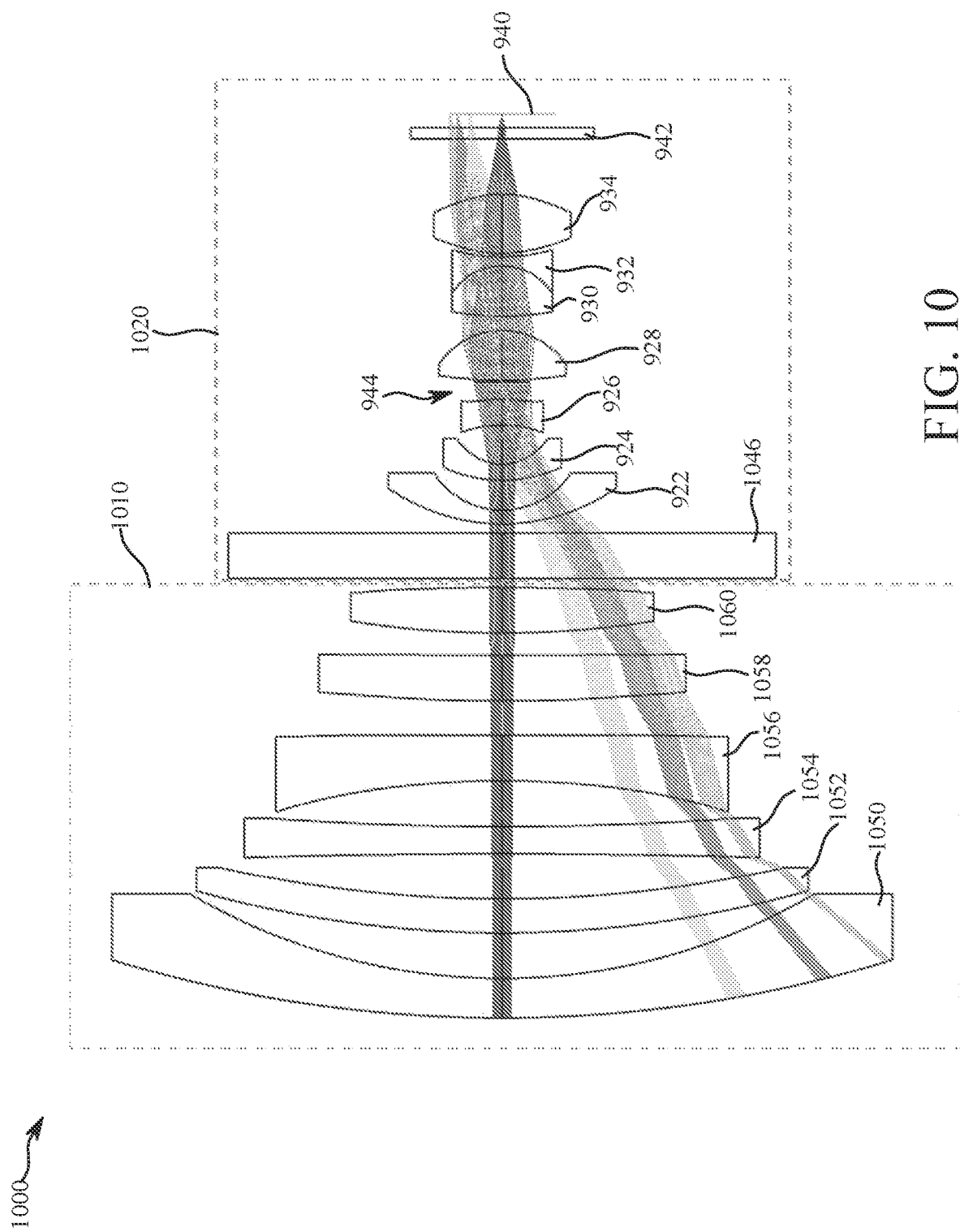
FIG. 10 is an illustration of an example of a combination of lens stacks of a conversion lens assembly and a mother lens assembly.

FIG. 10 is an illustration of an example of a combination of lens stacks 1000 of a conversion lens assembly 1010 and a mother lens assembly 1020. The conversion lens assembly 1010 is position at an end of the mother lens assembly 1020, opposite from an image plane 940 onto which light is focused for image capture. The mother lens assembly 1020 includes a stack of lenses, from outer to inner, including an L1 lens 922; an L2 lens 924, and L3 lens 926, an L4 lens 928, an L5 lens 930, an L6 lens 932, and an L7 lens 934. The mother lens assembly 1020 includes the stack of lenses of the mother lens assembly 920 of FIG. 9, with the addition of a camera cover glass 1046. The stack of lenses (922-934 is configured to focus light incident on the L1 lens 922 on the image plane 940, which may correspond to light sensitive surface of an image sensor (e.g., the image sensor 420). The refracted light also passes through a sensor cover glass 942, an aperture stop 944 positioned between the L3 lens 926 and the L4 lens 928, and the camera cover glass 1046. The conversion lens assembly 1010 includes a stack of lenses, from outer to inner, including an L1 lens 1050; an L2 lens 1052, and L3 lens 1054, an L4 lens 1056, an L5 lens 1058, and an L6 lens 1060. The stack of lenses (1050-1060) is configured to refract light incident on the L1 lens 1050 on to the L1 lens 922 of the mother lens assembly 1020, through the camera cover glass 1046.

For example, the combination of lens stacks 1000 of a conversion lens assembly 1010 and the mother lens assembly 1020 may have a relative aperture (F/#) of 2.6 and a design wavelength of 455 nanometers (nm) to 661 nm. The combination of lens stacks 1000 of a conversion lens assembly 1010 and the mother lens assembly 1020 may convert a 146° angular field of view and image circle of 8 mm to a 170° angular field of view and 4.75 mm image circle.

For example, the L1 lens 1050 may be spherical and made from S-LAL18 (with index of refraction 1.729 and abbe number 54.7) with an outer (object side) radius of curvature of 58.533932 millimeters (mm), an inner (sensor side) radius of curvature of 27.095852 mm, and a center thickness of 1.736960 mm. The air gap between the L1 lens 1050 and the L2 lens 1052 has a center thickness of 2.000000 mm. For example, the L2 lens 1052 may be spherical and made from S-TIM25 (with index of refraction 1.673 and abbe number 32.1) with an outer (object side) radius of curvature of 49.537793 millimeters (mm), an inner (sensor side) radius of curvature of 55.923002 mm, and a center thickness of 1.500000 mm. The air gap between the L2 lens 1052 and the L3 lens 1054 has a center thickness of 1.997098 mm. For example, the L3 lens 1054 may be spherical and made from S-LAH59 (with index of refraction 1.816 and abbe number 46.6) with an outer (object side) radius of curvature of −391.726885 millimeters (mm), an inner (sensor side) radius of curvature of 145.099172 mm, and a center thickness of 1.199015 mm. The air gap between the L3 lens 1054 and the L4 lens 1056 has a center thickness of 2.001884 mm. For example, the L4 lens 1056 may be even aspherical and made from S-NBH57 (with index of refraction 1.850 and abbe number 30.0) with an outer (object side) radius of curvature of −42.778003 mm, an outer conic constant of 5.342135, an outer $4^{th}$ order coefficient of $-6.892025 \times 10^{\wedge}-6$, an outer $6^{th}$ order coefficient of $-5.493958 \times 10^{\wedge}-8$, an outer $8^{th}$ order coefficient of $6.953176 \times 10^{\wedge}-11$, an outer $10^{th}$ order coefficient of $-1.508806 \times 10^{\wedge}-14$, an outer $12^{th}$ order coefficient of $1.611067 \times 10^{\wedge}-15$, an outer $14^{th}$ order coefficient of $1.151363 \times 10^{\wedge}-16$, an inner (sensor side) radius of curvature of 665.366557 mm, an inner conic constant of −994.526144, an inner $4^{th}$ order coefficient of $-1.270704 \times 10^{\wedge}-5$, an inner $6^{th}$ order coefficient of $-5.532322 \times 10^{\wedge}-8$, an inner $8^{th}$ order coefficient of $-1.191821 \times 10^{\wedge}-10$, an inner $10^{th}$ order coefficient of $1.116886 \times 10^{\wedge}-12$, an inner $12^{th}$ order coefficient of $-7.176472 \times 10^{\wedge}-15$, an inner $14^{th}$ order coefficient of $-1.125246 \times 10^{\wedge}-16$, and a center thickness of 2.003888 mm. The air gap between the L4 lens 1056 and the L5 lens 1058 has a center thickness of 1.507238 mm. For example, the L5 lens 1058 may be even aspherical and made from S-NPH3 (with index of refraction 1.959 and abbe number 17.5) with an outer (object side) radius of curvature of 64.932073 mm, an outer conic constant of −16.708640, an outer $4^{th}$ order coefficient of $-1.298815 \times 10^{\wedge}-5$, an outer $6^{th}$ order coefficient of $-8.758034 \times 10^{\wedge}-8$, an outer $8^{th}$ order coefficient of $-5.125759 \times 10^{\wedge}-10$, an outer $10^{th}$ order coefficient of $-3.927940 \times 10^{\wedge}-12$, an outer $12^{th}$ order coefficient of $3.671350 \times 10^{\wedge}-14$, an outer $14^{th}$ order coefficient of $5.744332 \times 10^{\wedge}-16$, an inner (sensor side) radius of curvature of 668.249903 mm, an inner conic constant of 996.159319, an inner $4^{th}$ order coefficient of $-1.181719 \times 10^{\wedge}-5$, an inner 6th order coefficient of $7.873235 \times 10^{\wedge}-8$, an inner $8^{th}$ order coefficient of $9.502605 \times 10^{\wedge}-10$, an inner $10^{th}$ order coefficient of $5.824033 \times 10^{\wedge}-12$, an inner $12^{th}$ order coefficient of $1.263311 \times 10^{\wedge}-13$, an inner $14^{th}$ order coefficient of $-8.252160 \times 10^{\wedge}-16$, and a center thickness of 2.007680 mm. The air gap between the L5 lens 1058 and the L6 lens 1060 has a center thickness of 1.006621 mm. For example, the L6 lens 1060 may be even aspherical and made from S-LAL18 (with index of refraction 1.729 and abbe number 54.7) with an outer (object side) radius of curvature of 44.098341 mm, an outer conic constant of 3.020472, an outer 4th order coefficient of $4.413772 \times 10^{\wedge}-6$, an outer $6^{th}$ order coefficient of $8.596087 \times 10^{\wedge}-8$, an outer $8^{th}$ order coefficient of $-1.719820 \times 10^{\wedge}-9$, an outer $10^{th}$ order coefficient of $1.699664 \times 10^{\wedge}-11$, an outer $12^{th}$ order coefficient of $2.696776 \times 10^{\wedge}-13$, an outer $14^{th}$ order coefficient of $3.756882 \times 10^{\wedge}-15$, an inner (sensor side) radius of curvature of −157.293657 mm, an inner conic constant of 481.971256, an inner $4^{th}$ order coefficient of $-1.972156 \times 10^{\wedge}5$, an inner $6^{th}$ order coefficient of $-3.327397 \times 10^{\wedge}-7$, an inner $8^{th}$ order coefficient of $-4.060257 \times 10^{\wedge}-9$, an inner $10^{th}$ order coefficient of $-9.851074 \times 10^{\wedge}-11$, an inner $12^{th}$ order coefficient of $1.889099 \times 10^{\wedge}-12$, an inner $14^{th}$ order coefficient of $1.239042 \times 10^{\wedge}-13$, and a center thickness of 1.990646 mm. The air gap between the L6 lens 1060 and the mother lens assembly 1020 has a center thickness of 0.400000 mm.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:
1. An image capture device comprising:
  a mother lens assembly including a first stack of lenses;
  an image sensor positioned at a first end of the mother lens assembly and configured to detect images based on light incident on the image sensor through the first stack of lenses;
  a conversion lens assembly including a second stack of lenses,
    wherein the second stack of lenses is afocal, and
    wherein the first stack of lenses and the second stack of lenses combined have a smaller magnification than that of the first stack of lenses alone; and a conversion lens mounting apparatus configured to removably attach the conversion lens assembly to the image capture device in a position over a second end of the mother lens assembly, opposite from the image sensor, such that light incident on an outer lens of the second stack of lenses will be refracted through the second stack of lenses and the first stack of lenses to the image sensor.

2. The image capture device of claim 1, wherein an exit pupil of the conversion lens assembly is sized to overfill a corresponding entrance pupil of the mother lens assembly.

3. The image capture device of claim 2, wherein an amount by which the exit pupil is sized to overfill the corresponding entrance pupil exceeds a mounting tolerance of the conversion lens mounting apparatus.

4. The image capture device of claim 2, wherein an amount by which the exit pupil is sized to overfill the corresponding entrance pupil exceeds a manufacturing tolerance for alignment of the second stack of lenses to a portion of the conversion lens mounting apparatus.

5. The image capture device of claim 2, wherein an amount by which the exit pupil is sized to overfill the corresponding entrance pupil exceeds a manufacturing tolerance for alignment of the first stack of lenses to a portion of the conversion lens mounting apparatus.

6. The image capture device of claim 1, wherein the conversion lens assembly has a wider field of view than the mother lens assembly.

7. The image capture device of claim 1, wherein the outer lens of the conversion lens assembly is a fisheye lens.

8. The image capture device of claim 1, wherein the outer lens of the conversion lens assembly is hyper-hemispherical.

9. The image capture device of claim 1, wherein the conversion lens mounting apparatus comprises:
a bayonet mechanism configured to enable attachment of the conversion lens assembly to the image capture device.

10. The image capture device of claim 1, wherein a best image plane of the second stack of lenses combined with the first stack of lenses, when the conversion lens assembly is attached to the image capture device, is the same as a best image plane of the first stack of lenses alone when the conversion lens assembly is removed from the image capture device.

11. The image capture device of claim 1, wherein a relative aperture of the second stack of lenses combined with the first stack of lenses, when the conversion lens assembly is attached to the image capture device, is the same as a relative aperture of the first stack of lenses alone when the conversion lens assembly is removed from the image capture device.

12. An image capture device comprising:
a mother lens assembly including a first stack of lenses and an aperture stop disposed between two lenses of the first stack of lenses;
an image sensor positioned at a first end of the mother lens assembly and configured to detect images based on light incident on the image sensor through the first stack of lenses and the aperture stop;
a conversion lens assembly including a second stack of lenses; and
a conversion lens mounting apparatus configured to removably attach the conversion lens assembly to the image capture device in a position over a second end of the mother lens assembly, opposite from the image sensor, such that light incident on an outer lens of the second stack of lenses will be refracted through the second stack of lenses and the first stack of lenses to the image sensor,
wherein a best image plane of the second stack of lenses combined with the first stack of lenses, when the conversion lens assembly is attached to the image capture device, is the same as a best image plane of the first stack of lenses alone when the conversion lens assembly is removed from the image capture device.

13. The image capture device of claim 12, wherein an image circle of the second stack of lenses combined with the first stack of lenses, when the conversion lens assembly is attached to the image capture device, is inscribed within a light sensitive area of the image sensor.

14. The image capture device of claim 12, wherein an image circle of the first stack of lenses alone, when the conversion lens assembly is removed from the image capture device, encompasses a light sensitive area of the image sensor.

15. The image capture device of claim 12, wherein the conversion lens assembly has a wider field of view than the mother lens assembly.

16. The image capture device of claim 12, wherein a relative aperture of the second stack of lenses combined with the first stack of lenses, when the conversion lens assembly is attached to the image capture device, is the same as a relative aperture of the first stack of lenses alone when the conversion lens assembly is removed from the image capture device.

17. An image capture device comprising:
a mother lens assembly including a first stack of lenses;
an image sensor positioned at a first end of the mother lens assembly and configured to detect images based on light incident on the image sensor through the first stack of lenses;
a conversion lens assembly including a second stack of lenses; and
a conversion lens mounting apparatus configured to removably attach the conversion lens assembly to the image capture device in a position over a second end of the mother lens assembly, opposite from the image sensor, such that light incident on an outer lens of the second stack of lenses will be refracted through the second stack of lenses and the first stack of lenses to the image sensor,
wherein a relative aperture of the second stack of lenses combined with the first stack of lenses, when the conversion lens assembly is attached to the image capture device, is the same as a relative aperture of the first stack of lenses alone when the conversion lens assembly is removed from the image capture device, and
wherein an image circle of the second stack of lenses combined with the first stack of lenses, when the conversion lens assembly is attached to the image capture device, is smaller than an image circle of the first stack of lenses alone when the conversion lens assembly is removed from the image capture device.

18. The image capture device of claim 17, wherein the image circle of the second stack of lenses combined with the first stack of lenses, when the conversion lens assembly is attached to the image capture device, is inscribed within a light sensitive area of the image sensor.

19. The image capture device of claim 17, wherein the image circle of the first stack of lenses alone, when the conversion lens assembly is removed from the image capture device, encompasses a light sensitive area of the image sensor.

20. The image capture device of claim 17, wherein the conversion lens assembly has a wider field of view than the mother lens assembly.

* * * * *